(12) United States Patent
Bhai et al.

(10) Patent No.: US 8,757,308 B2
(45) Date of Patent: Jun. 24, 2014

(54) POWERED TRANSPORT SYSTEM AND CONTROL METHODS

(75) Inventors: Aziz A. Bhai, West Chester, OH (US); Stephen R. Hamberg, Cincinnati, OH (US); Christian H. Reinke, York, SC (US); Steven V. McCaig, Batesville, IN (US)

(73) Assignee: Hill-Rom Services Inc., Batesville, IN (US)

(*) Notice: Subject to any disclaimer, the term of this patent is extended or adjusted under 35 U.S.C. 154(b) by 796 days.

(21) Appl. No.: 12/878,057

(22) Filed: Sep. 9, 2010

(65) Prior Publication Data

US 2011/0083270 A1 Apr. 14, 2011

Related U.S. Application Data

(60) Provisional application No. 61/241,388, filed on Sep. 10, 2009.

(51) Int. Cl.
*B60W 10/04* (2006.01)
*G06F 7/70* (2006.01)

(52) U.S. Cl.
USPC ......... 180/65.285; 180/65.1; 701/70; 701/79; 5/510

(58) Field of Classification Search
USPC .............. 180/19.3, 19.1, 19.2, 15–16, 11–13, 180/199, 200–203, 65.1, 165; 701/53–54, 701/58, 70; 5/510–511
See application file for complete search history.

(56) References Cited

U.S. PATENT DOCUMENTS

| | | | |
|---|---|---|---|
| 813,213 | A | 2/1906 | Johnson |
| 1,110,838 | A | 9/1914 | Taylor |
| 1,118,931 | A | 12/1914 | Hasley |
| 1,598,124 | A | 8/1926 | Evans |
| 1,639,801 | A | 8/1927 | Heise |
| 1,778,698 | A | 10/1930 | Walter |
| 2,224,087 | A | 12/1940 | Reichert |
| 2,599,717 | A | 6/1952 | Menzies |
| 2,635,899 | A | 4/1953 | Osbon, Jr. |
| 2,999,555 | A | 9/1961 | Stroud et al. |
| 3,004,768 | A | 10/1961 | Klages |

(Continued)

FOREIGN PATENT DOCUMENTS

| | | |
|---|---|---|
| CA | 2010543 | 9/1990 |
| CA | 2294761 | 1/1999 |

(Continued)

OTHER PUBLICATIONS

Stryker Medical, 2040 Zoom™ Critical Care Bed Maintenance Manual, date unknown.

(Continued)

*Primary Examiner* — John Walters
*Assistant Examiner* — James Triggs
(74) *Attorney, Agent, or Firm* — Barnes & Thornburg LLP

(57) ABSTRACT

A powered transport device for a person support apparatus includes a floor contacting driver, a prime mover, a power source and a controller. The prime mover is coupled to the driver and an output of the prime mover provides input to the driver. The power source provides power to the prime mover. The controller senses a performance characteristic of the powered transport device and varies the operation of the powered transport device based solely on the performance characteristic.

19 Claims, 24 Drawing Sheets

(56) References Cited

U.S. PATENT DOCUMENTS

| | | |
|---|---|---|
| 3,112,001 A | 11/1963 | Wise |
| 3,304,116 A | 2/1967 | Stryker |
| 3,305,876 A | 2/1967 | Hutt |
| 3,380,546 A | 4/1968 | Rabjohn |
| 3,393,004 A | 7/1968 | Williams |
| 3,404,746 A | 10/1968 | Slay |
| 3,452,371 A | 7/1969 | Hirsch |
| 3,544,127 A | 12/1970 | Dobson |
| 3,618,966 A | 11/1971 | Vandervest |
| 3,680,880 A | 8/1972 | Blaauw |
| 3,770,070 A | 11/1973 | Smith |
| 3,802,524 A | 4/1974 | Seidel |
| 3,814,199 A | 6/1974 | Jones |
| 3,820,838 A | 6/1974 | Limpach |
| 3,869,011 A | 3/1975 | Jensen |
| 3,872,945 A | 3/1975 | Hickman et al. |
| 3,876,024 A | 4/1975 | Shieman et al. |
| 3,938,608 A | 2/1976 | Folco-Zambelli |
| 4,137,984 A | 2/1979 | Jennings et al. |
| 4,164,355 A | 8/1979 | Eaton et al. |
| 4,167,221 A | 9/1979 | Edmonson et al. |
| 4,175,632 A | 11/1979 | Lassanske |
| 4,175,783 A | 11/1979 | Pioth |
| 4,221,273 A | 9/1980 | Finden |
| 4,274,503 A | 6/1981 | Mackintosh |
| 4,275,797 A | 6/1981 | Johnson |
| 4,415,049 A | 11/1983 | Wereb |
| 4,415,050 A | 11/1983 | Nishida et al. |
| 4,439,879 A | 4/1984 | Werner |
| 4,444,284 A | 4/1984 | Montemurro |
| 4,475,611 A | 10/1984 | Fisher |
| 4,475,613 A | 10/1984 | Walker |
| 4,511,825 A | 4/1985 | Klimo |
| 4,513,832 A | 4/1985 | Engman |
| 4,566,707 A | 1/1986 | Nitzberg |
| 4,584,989 A | 4/1986 | Stith |
| 4,614,246 A | 9/1986 | Masse et al. |
| 4,629,242 A | 12/1986 | Schrager |
| 4,646,860 A | 3/1987 | Owens et al. |
| 4,723,808 A | 2/1988 | Hines |
| 4,724,555 A | 2/1988 | Poehner et al. |
| 4,759,418 A | 7/1988 | Goldenfeld et al. |
| 4,771,840 A | 9/1988 | Keller |
| 4,807,716 A | 2/1989 | Hawkins |
| 4,811,988 A | 3/1989 | Immel |
| 4,848,504 A | 7/1989 | Olson |
| 4,874,055 A | 10/1989 | Beer |
| 4,895,040 A | 1/1990 | Soederberg |
| 4,922,574 A | 5/1990 | Heiligenthal et al. |
| 4,938,493 A | 7/1990 | Okuda |
| 4,949,408 A | 8/1990 | Trkla |
| 4,979,582 A | 12/1990 | Forster |
| 4,981,309 A | 1/1991 | Froeschle et al. |
| 5,039,119 A * | 8/1991 | Baughman .................... 280/166 |
| 5,060,327 A | 10/1991 | Celestina et al. |
| 5,060,959 A | 10/1991 | Davis et al. |
| 5,069,465 A | 12/1991 | Stryker et al. |
| 5,083,625 A | 1/1992 | Bleicher |
| 5,084,922 A | 2/1992 | Louit |
| 5,094,314 A | 3/1992 | Hayata |
| 5,117,521 A | 6/1992 | Foster et al. |
| 5,121,806 A | 6/1992 | Johnson |
| 5,156,226 A | 10/1992 | Boyer et al. |
| 5,181,762 A | 1/1993 | Beumer |
| 5,187,824 A | 2/1993 | Stryker |
| 5,193,633 A | 3/1993 | Ezenwa |
| 5,201,819 A | 4/1993 | Shiraishi et al. |
| 5,222,567 A | 6/1993 | Broadhead et al. |
| 5,232,065 A | 8/1993 | Cotton |
| 5,244,225 A | 9/1993 | Frycek |
| 5,251,429 A | 10/1993 | Minato et al. |
| 5,255,403 A | 10/1993 | Ortiz |
| 5,279,010 A | 1/1994 | Ferrand et al. |
| 5,284,218 A | 2/1994 | Rusher, Jr. |
| 5,293,950 A | 3/1994 | Marliac |
| 5,307,889 A | 5/1994 | Bohannan |
| 5,322,306 A | 6/1994 | Coleman |
| 5,337,845 A | 8/1994 | Foster et al. |
| 5,348,326 A | 9/1994 | Fullenkamp et al. |
| 5,358,265 A | 10/1994 | Yaple |
| 5,366,036 A | 11/1994 | Perry |
| 5,381,572 A | 1/1995 | Park |
| 5,388,294 A | 2/1995 | Reeder |
| 5,406,778 A | 4/1995 | Lamb et al. |
| 5,439,069 A | 8/1995 | Beeler |
| 5,445,233 A | 8/1995 | Fernie et al. |
| 5,447,317 A | 9/1995 | Gehlsen et al. |
| 5,447,935 A | 9/1995 | Hubele et al. |
| 5,450,639 A | 9/1995 | Weismiller et al. |
| 5,477,935 A | 12/1995 | Chen |
| 5,487,437 A | 1/1996 | Avitan |
| 5,495,904 A | 3/1996 | Zwaan et al. |
| 5,526,890 A | 6/1996 | Kadowaki |
| 5,531,030 A | 7/1996 | Dale, Jr. |
| 5,535,465 A | 7/1996 | Hannant |
| 5,542,690 A | 8/1996 | Kozicki |
| 5,562,091 A | 10/1996 | Foster et al. |
| 5,570,483 A | 11/1996 | Williamson |
| 5,580,207 A | 12/1996 | Kiebooms et al. |
| 5,613,252 A | 3/1997 | Yu et al. |
| 5,669,086 A | 9/1997 | Garman |
| 5,687,437 A | 11/1997 | Goldsmith |
| 5,690,185 A | 11/1997 | Sengel |
| 5,697,623 A | 12/1997 | Bermes et al. |
| 5,737,782 A | 4/1998 | Matsuura et al. |
| 5,746,282 A | 5/1998 | Fujiwara et al. |
| 5,749,424 A | 5/1998 | Reimers |
| 5,775,456 A | 7/1998 | Reppas |
| 5,778,996 A | 7/1998 | Prior et al. |
| 5,806,111 A | 9/1998 | Heimbrock et al. |
| 5,809,755 A | 9/1998 | Velke et al. |
| 5,826,670 A | 10/1998 | Nan |
| 5,839,528 A | 11/1998 | Lee |
| 5,906,017 A | 5/1999 | Ferrand et al. |
| 5,915,487 A | 6/1999 | Splittstoesser et al. |
| 5,921,338 A | 7/1999 | Edmondson |
| 5,927,414 A | 7/1999 | Kan et al. |
| 5,934,694 A | 8/1999 | Schugt et al. |
| 5,937,959 A | 8/1999 | Fujii et al. |
| 5,937,961 A | 8/1999 | Davidson |
| 5,941,342 A * | 8/1999 | Lee .................................. 182/95 |
| 5,944,131 A | 8/1999 | Schaffner et al. |
| 5,964,313 A | 10/1999 | Guy |
| 5,964,473 A | 10/1999 | Degonda et al. |
| 5,971,091 A | 10/1999 | Kamen et al. |
| 5,983,425 A | 11/1999 | DiMucci et al. |
| 5,987,671 A | 11/1999 | Heimbrock et al. |
| 5,988,304 A | 11/1999 | Behrendts |
| 5,996,149 A | 12/1999 | Heimbrock et al. |
| 6,000,486 A | 12/1999 | Romick et al. |
| 6,016,580 A | 1/2000 | Heimbrock et al. |
| 6,035,561 A | 3/2000 | Paytas et al. |
| 6,050,356 A | 4/2000 | Takeda et al. |
| 6,059,060 A | 5/2000 | Kanno et al. |
| 6,059,301 A | 5/2000 | Skarnulis |
| 6,062,328 A | 5/2000 | Campbell et al. |
| 6,065,555 A | 5/2000 | Yuki et al. |
| 6,070,679 A | 6/2000 | Berg et al. |
| 6,073,285 A | 6/2000 | Ambach et al. |
| 6,076,208 A | 6/2000 | Heimbrock et al. |
| 6,076,209 A | 6/2000 | Paul |
| 6,098,732 A | 8/2000 | Romick et al. |
| 6,105,348 A | 8/2000 | Turk et al. |
| 6,125,957 A | 10/2000 | Kauffmann |
| 6,131,690 A | 10/2000 | Galando et al. |
| 6,148,942 A | 11/2000 | Mackert, Sr. |
| 6,154,690 A | 11/2000 | Coleman |
| 6,173,799 B1 | 1/2001 | Miyazaki et al. |
| 6,178,575 B1 | 1/2001 | Harada |
| 6,179,074 B1 | 1/2001 | Scharf |
| 6,209,670 B1 | 4/2001 | Fernie et al. |
| 6,256,812 B1 | 7/2001 | Bartow et al. |
| 6,286,165 B1 | 9/2001 | Heimbrock et al. |
| 6,330,926 B1 | 12/2001 | Heimbrock et al. |

(56) References Cited

U.S. PATENT DOCUMENTS

| | | |
|---|---|---|
| 6,343,665 B1 | 2/2002 | Eberlein et al. |
| 6,474,434 B1 | 11/2002 | Bech |
| 6,505,359 B2 | 1/2003 | Heimbrock et al. |
| 6,668,402 B2 | 12/2003 | Heimbrock |
| 6,668,965 B2 | 12/2003 | Strong |
| 6,725,956 B1 | 4/2004 | Lemire |
| 6,749,034 B2 | 6/2004 | Vogel et al. |
| 6,752,224 B2 * | 6/2004 | Hopper et al. .................. 180/22 |
| 6,772,850 B1 | 8/2004 | Waters et al. |
| 6,877,572 B2 | 4/2005 | Vogel et al. |
| 6,945,697 B2 | 9/2005 | Schuster |
| 7,011,172 B2 | 3/2006 | Heimbrock et al. |
| 7,014,000 B2 | 3/2006 | Kummer et al. |
| 7,083,012 B2 * | 8/2006 | Vogel et al. ...................... 180/15 |
| 7,090,041 B2 * | 8/2006 | Vogel et al. .................. 180/19.3 |
| 7,191,854 B2 * | 3/2007 | Lenkman ..................... 180/65.1 |
| 7,195,253 B2 | 3/2007 | Vogel et al. |
| 7,273,115 B2 | 9/2007 | Kummer et al. |
| 7,284,626 B2 * | 10/2007 | Heimbrock et al. ......... 180/65.1 |
| 7,407,024 B2 * | 8/2008 | Vogel et al. .................. 180/19.3 |
| 7,828,092 B2 * | 11/2010 | Vogel et al. .................. 180/19.3 |
| 7,953,537 B2 | 5/2011 | Bhai |
| 8,056,950 B2 * | 11/2011 | Souke et al. .................... 296/20 |
| 8,267,206 B2 * | 9/2012 | Vogel et al. .................. 180/19.3 |
| 8,442,738 B2 * | 5/2013 | Patmore .......................... 701/93 |
| 2002/0138905 A1 | 10/2002 | Bartlett et al. |
| 2002/0152555 A1 | 10/2002 | Gallant et al. |
| 2003/0163226 A1 | 8/2003 | Tan |
| 2004/0133982 A1 | 7/2004 | Horitani et al. |
| 2005/0199430 A1 | 9/2005 | Vogel et al. |
| 2006/0059623 A1 | 3/2006 | Karmer, Jr. et al. |
| 2007/0163043 A1 | 7/2007 | Lemire et al. |

FOREIGN PATENT DOCUMENTS

| | | |
|---|---|---|
| CA | 2589811 | 6/2006 |
| DE | 1 041 210 | 10/1958 |
| DE | 94 20 429 | 12/1994 |
| DE | 295 18 502 U1 | 1/1997 |
| DE | 199 21 503 | 4/2000 |
| EP | 0 062 180 A2 | 10/1982 |
| EP | 0 093 700 A2 | 11/1983 |
| EP | 0 204 637 A1 | 12/1986 |
| EP | 0 329 504 B1 | 8/1989 |
| EP | 0 352 647 B1 | 1/1990 |
| EP | 0 403 202 B1 | 12/1990 |
| EP | 0 420 263 A1 | 4/1991 |
| EP | 0 630 637 A1 | 12/1994 |
| EP | 0 653 341 A1 | 5/1995 |
| EP | 0 776 637 A1 | 6/1997 |
| EP | 0 776 648 A1 | 6/1997 |
| EP | 0967535 | 12/1999 |
| EP | 991529 B1 | 4/2000 |
| FR | 2 714 008 | 6/1995 |
| FR | 2 735 019 | 12/1996 |
| FR | 2 746 060 | 9/1997 |
| GB | 415450 | 8/1934 |
| GB | 672557 | 5/1952 |
| GB | 1 601 930 | 11/1981 |
| GB | 2 285 393 A | 7/1995 |
| JP | 46-31490 | 9/1971 |
| JP | 47-814 | 8/1972 |
| JP | 47-17495 | 10/1972 |
| JP | 47-44792 | 6/1973 |
| JP | 48-44792 | 6/1973 |
| JP | 48-44793 | 6/1973 |
| JP | 48-54494 | 7/1973 |
| JP | 48-54495 | 7/1973 |
| JP | 49-29855 | 3/1974 |
| JP | 51-20491 | 2/1976 |
| JP | 53-9091 | 1/1978 |
| JP | 53-96397 | 8/1978 |
| JP | 56-68523 | 6/1981 |
| JP | 56-68524 | 6/1981 |
| JP | 56-73822 | 6/1981 |
| JP | 57-157325 | 10/1982 |
| JP | 57-187521 | 11/1982 |
| JP | 58 06357 | 4/1983 |
| JP | 59-37946 | 3/1984 |
| JP | 59-38176 | 3/1984 |
| JP | 59-183756 | 10/1984 |
| JP | 59-186554 | 10/1984 |
| JP | 60-12058 | 1/1985 |
| JP | 60-12059 | 1/1985 |
| JP | 60-21751 | 2/1985 |
| JP | 60-31749 | 2/1985 |
| JP | 60-31750 | 2/1985 |
| JP | 60-31751 | 2/1985 |
| JP | 60-122561 | 7/1985 |
| JP | 60-188152 | 9/1985 |
| JP | 60-188153 | 9/1985 |
| JP | 61 88727 | 8/1986 |
| JP | 61-188727 | 11/1986 |
| JP | 62-60433 | 4/1987 |
| JP | 64-17231 | 1/1989 |
| JP | 2-84961 | 3/1990 |
| JP | 3-31063 | 2/1991 |
| JP | 4-108525 | 9/1992 |
| JP | 6-50631 | 7/1994 |
| JP | 6-237959 | 8/1994 |
| JP | 7-136215 | 5/1995 |
| JP | 7 328074 | 12/1995 |
| JP | 8-112244 | 5/1996 |
| JP | 8-317953 | 12/1996 |
| JP | 9-24071 | 1/1997 |
| JP | 9-38154 | 2/1997 |
| JP | 9-38155 | 2/1997 |
| JP | 10-146364 | 6/1998 |
| JP | 10-181609 | 7/1998 |
| JP | 10-305705 | 11/1998 |
| JP | 200-118407 | 4/2000 |
| JP | 2000-107230 | 4/2000 |
| JP | 2000-175974 | 6/2000 |
| WO | WO 82-01313 | 4/1982 |
| WO | WO 87/07830 | 12/1987 |
| WO | WO 94/16935 | 8/1994 |
| WO | WO 94/21505 | 9/1994 |
| WO | WO 95/20514 | 8/1995 |
| WO | WO 96/07555 | 3/1996 |
| WO | WO 96/33900 | 10/1996 |
| WO | WO 97/39715 | 10/1997 |
| WO | WO 99/01298 | 1/1999 |
| WO | WO 00/37222 | 6/2000 |
| WO | WO 00/51830 | 8/2000 |
| WO | WO 01/19313 | 3/2001 |
| WO | WO 01/85084 | 11/2001 |
| WO | WO 2005/028243 | 3/2005 |
| WO | WO 2005/068276 A1 | 7/2005 |
| WO | WO 2006/059200 A2 | 6/2006 |

OTHER PUBLICATIONS

Motorvator 3 Product Features Webpage, May 10, 2000.
Stryker Corporation Zoom™ drive brochure, Mar. 2000.
Midmark 530 Stretcher Information, Midmark Catalog, p. 14.
Tri-Flex II by Burke, Inc., "Operation Manual Impulse Drive System," (2004).
European Search Report from EP 09250422 dated Feb. 19, 2010.

* cited by examiner

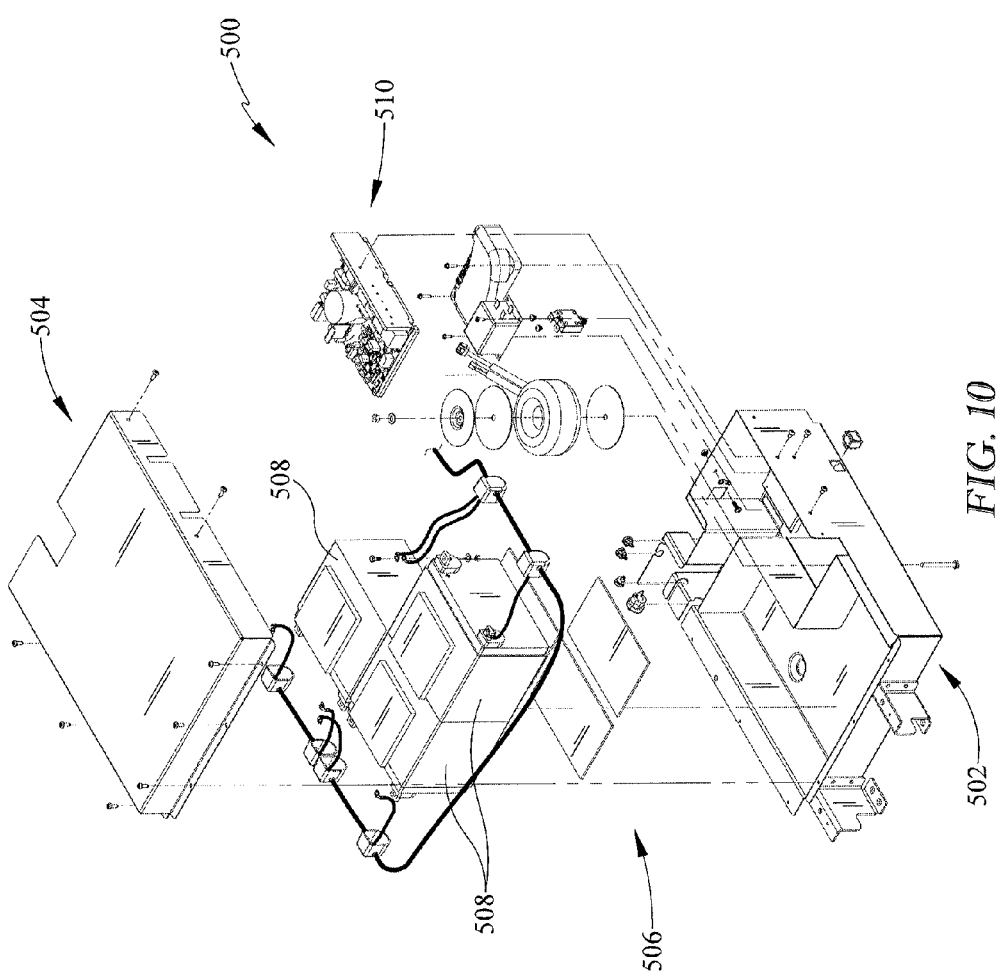

POWERED TRANSPORT SYSTEM AND CONTROL METHODS

RELATED APPLICATIONS

This application claims priority under 35 U.S.C. §119(e) to U.S. Provisional Application Ser. No. 61/241,388, filed Oct. Sep. 10, 2009, which is expressly incorporated by reference herein. This application is related to U.S. patent application Ser. No. 11/865,763 filed Oct. 2, 2007 and U.S. patent application Ser. No. 12/040,446 filed Feb. 29, 2008, both of which are incorporated by reference herein.

BACKGROUND

The present disclosure is related to support apparatuses for supporting persons. More specifically, the present disclosure is related to a person support apparatus such as a hospital bed having a powered transport system to propel the support apparatus across a floor to transport a patient.

Person support apparatuses such as hospital beds, for example, typically include a plurality of wheels and are manually moved over a floor. A bed may weigh several hundred pounds and may carry additional loads including the person supported and medical equipment used in the care of the person supported on the bed.

Motorized carts which couple to a bed and propel the bed across a floor are known to be used. The carts may include controls for use by a caregiver in operating the cart to move the bed. A single cart may be used to move multiple beds by moving the cart from bed to bed.

In some beds, a motorized drive mechanism may be positioned on the frame of the bed and configured to propel the bed. The drive mechanism may have a wheel or a track which contacts the floor and is driven to propel the bed in a direction parallel to the longitudinal axis of the bed. In some instances, the drive mechanism maintains constant contact with the floor.

SUMMARY

The present application discloses one or more of the features recited in the appended claims and/or the following features which, alone or in any combination, may comprise patentable subject matter.

According one aspect of the present disclosure a powered transport device for a person support apparatus includes a floor contacting driver, a prime mover, a power source and a controller. The prime mover is coupled to the driver and an output of the prime mover provides input to the driver. The power source provides power to the prime mover. The controller senses a performance characteristic of the powered transport device and varies the operation of the powered transport device based solely on the performance characteristic.

The controller may vary the speed of the prime mover based on an input from a user. In some embodiments the controller senses that the driver is slipping relative to the floor and adjusts the output of the prime mover to reduce the slippage of the driver. In some embodiments the controller senses that the load on the prime mover is increasing and adjusts the output of the prime mover to maintain a constant speed of the driver relative to the floor.

The controller may sense a variation in the operation of the transport system and adjusts an operating parameter of the transport system. In some embodiments, the controller senses an operating characteristic of the power source and varies the operation of the transport system to mitigate variations in the operating characteristic of the power source.

The controller may sense an input from a user and an operating characteristic of the transport system and vary the operation of the transport system based on both the user input and the operating characteristic.

In some embodiments, the floor contacting driver is movable between a first position wherein the driver is in contact with the floor and a second position wherein the driver is not in contact with the floor. The floor contacting driver may be movable between a first position wherein the floor contacting driver is configured to drive the person support apparatus in a direction parallel to the longitudinal axis of the person support apparatus and a second position wherein the floor contacting driver is configured to drive the person support apparatus in a direction parallel to a lateral axis the person support apparatus.

In another aspect of the present disclosure, a powered transport device for a person support apparatus includes a floor contacting driver, a prime mover coupled to the driver and with an output of the prime mover providing input to the driver, a power source providing power to the prime mover, and a controller. The controller provides a drive signal to the prime mover, the drive signal indicative of a desired speed of movement of the powered transport device. The controller also senses the actual speed of the driver of the powered transport device and varies the drive signal to respond to differences between the actual speed and the desired speed.

In some embodiments, the prime mover comprises a motor, an output coupled to the driver, and a chain coupled to the motor and the output to transfer motion from the motor to the output.

The transport device may further include a vertical deployment mechanism configured to move the driver to a position contacting the floor.

In some embodiments, the power source comprises a battery.

The controller may monitor the charge of a battery and the operating state of the powered transport device and vary the charging of the battery to mitigate the effects of changes in the operating state of the powered transport device. The controller may monitor the battery to determine the rate of discharge of the battery and determine the rate of voltage drop as a function of the battery discharge while the powered transport device operates.

In yet another aspect of the present disclosure, a method of operating a powered transport device for a person support apparatus includes monitoring a user input to determine a desired speed for the powered transport device. The method further includes providing a signal to a driver of the powered transport device, the signal being based on the user input. The method also includes monitoring the performance of the driver and comparing the performance of the driver to determine the actual speed of the driver. The method also includes comparing the actual speed to the desired speed and adjusting the signal to the driver to compensate for differences between the desired speed and the actual speed to mitigate changes in the operating environment of the powered transport device.

The method may further include determining a parameter indicative of the age of a battery for powering the driver. The method may still further include determining the rate of discharge of the battery. The method may also include determining the rate of voltage drop as a function of the battery discharge during operation of the powered transport device.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

FIG. 10 is an exploded perspective view of a control box for a powered transport system for a patient-support apparatus;

DETAILED DESCRIPTION OF THE DRAWINGS

Figure 1:
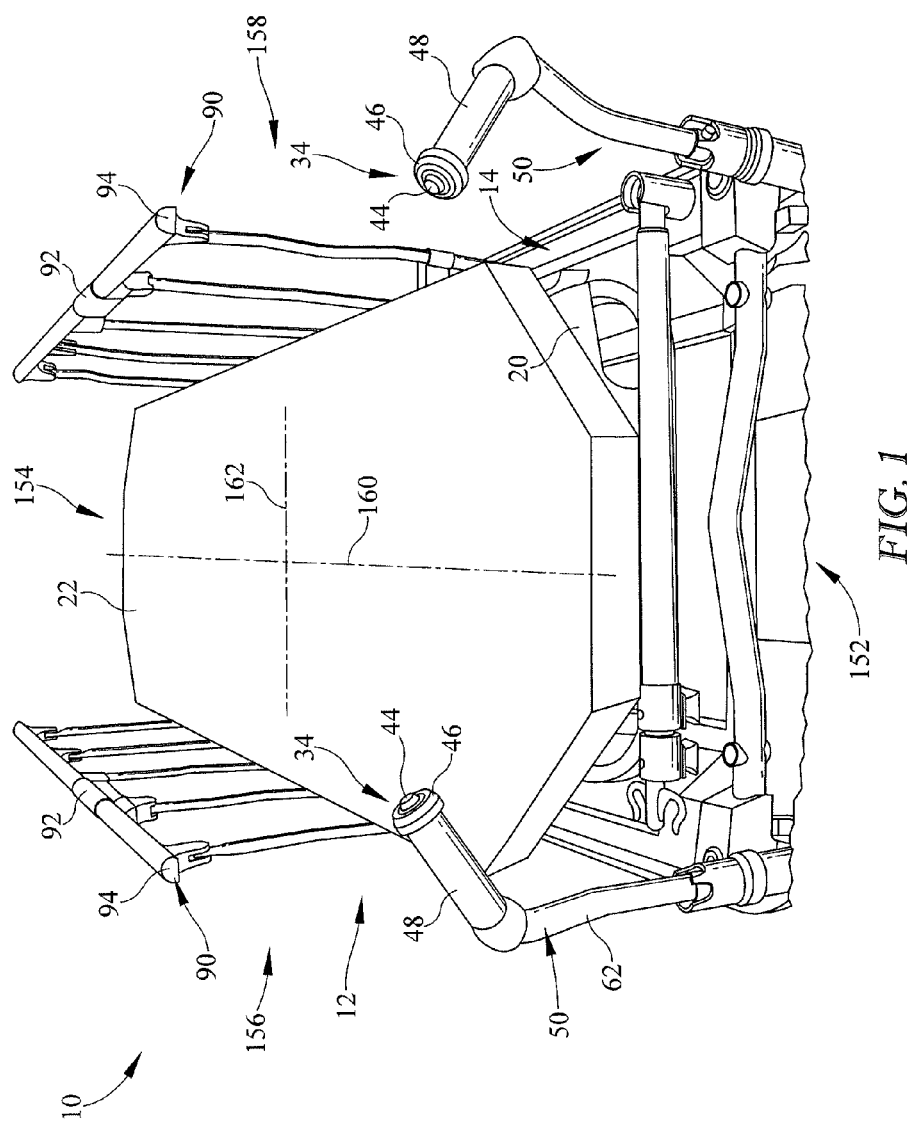
FIG. 1 is a perspective view of a portion of a person support apparatus viewed from the head end of the person support apparatus.
Figure 2:
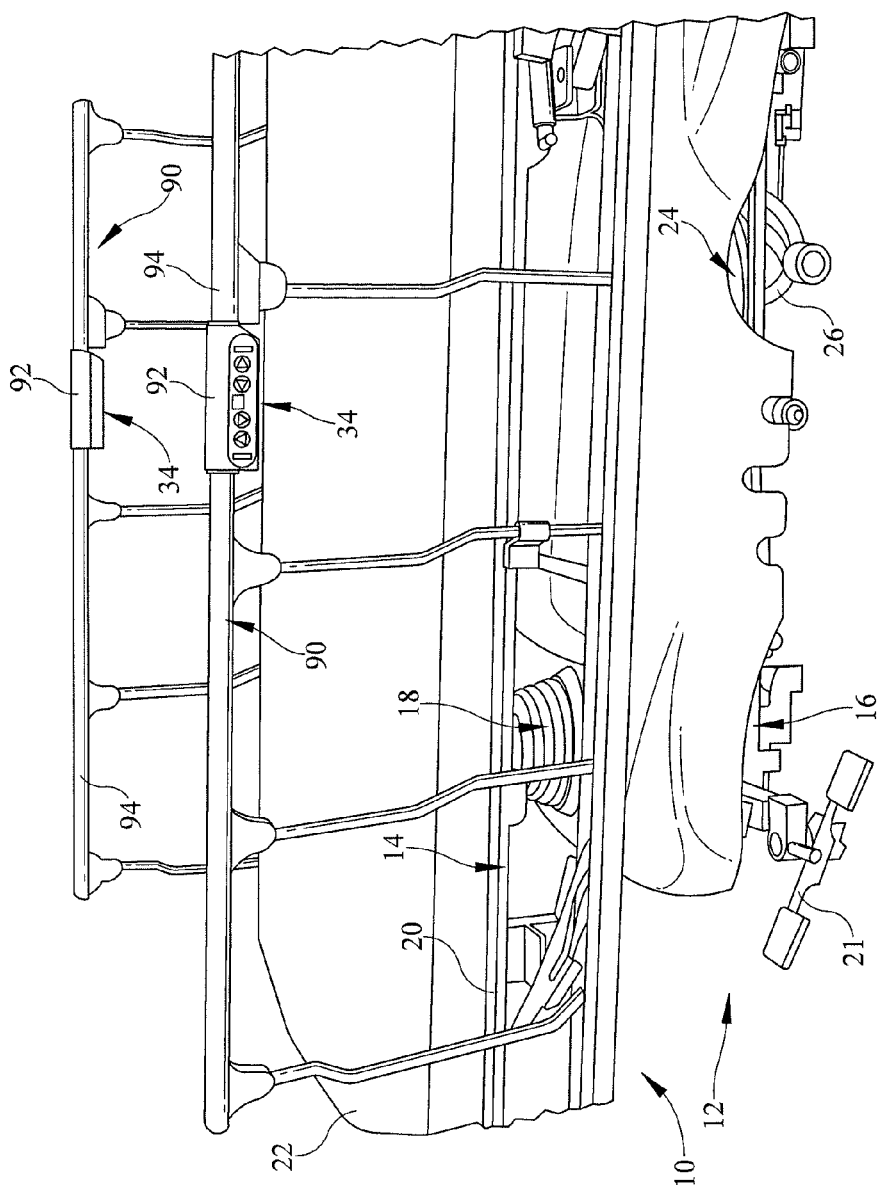
FIG. 2 is partial side perspective view of the person support apparatus of FIG. 1.
Figure 4:
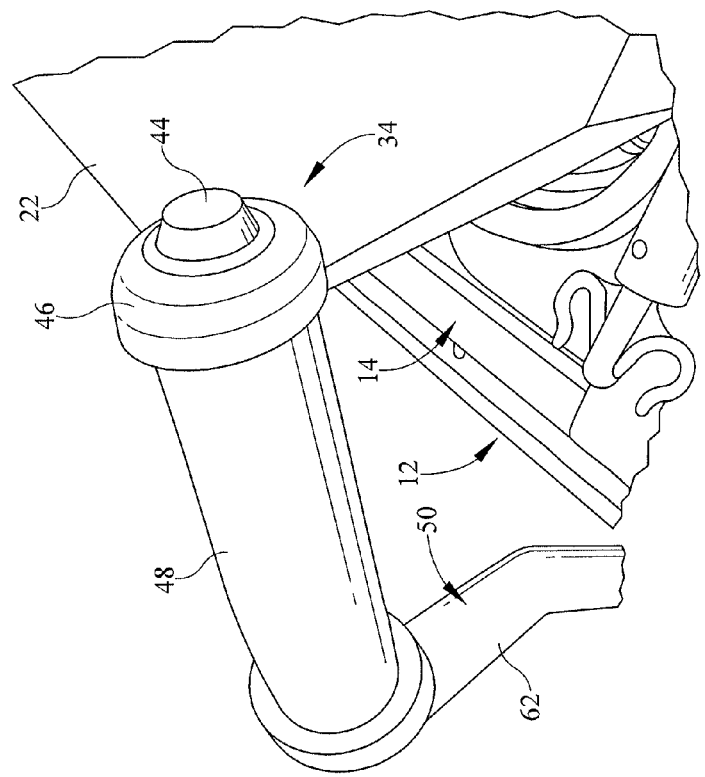
FIG. 4 is an enlarged perspective view of a portion of the person support apparatus of FIG. 1 showing a handle positioned at the head end of the person support apparatus.

As shown in FIGS. 1-2 and 4, a patient support apparatus 10, illustratively embodied as a stretcher, includes a frame 12 which has an upper frame 14 and a base frame or lower frame 16 (best seen in FIG. 2). The base frame 16 supports two elevation adjustment mechanisms 18 that are operable to raise, lower, and tilt upper frame 14 relative to the base frame 16. A patient support 20, such an articulating deck, is coupled to upper frame 14. A mattress 22 is carried by patient support 20. A plurality of casters (not shown) is coupled to base frame 16 and are in contact with the underlying floor. The casters include braking mechanisms (not shown) which are well known in the art and apparatus 10 has a set of brake/steer pedals 21 which are movable to brake and release the casters via manipulation of the associated caster braking mechanisms. The apparatus 10 has a head end 152, a foot end 154, a left side 156, a right side 158, a longitudinal axis 160, and a transverse or lateral axis 162 as shown in FIG. 2.

Referring now to FIG. 2, the person support apparatus 10 includes a powered transport system that has a powered transport device 24 coupled to base frame 16 and includes a wheel 26 that is motor driven to propel apparatus 10 along a floor. In one embodiment, powered transport device 24 is of the type available from Borringia Industries AG of Ettingen, Switzerland, one version of which is marketed as the COMPASS™ drive. Such a powered transport device 24, therefore, may be constructed in accordance with the teachings of PCT Patent Application No. PCT Publication No. WO 2006/059200 A2 which is hereby incorporated by reference herein and which has a motor driven wheel 26 that can be raised out of contract with the floor, lowered into contact with the floor, and swiveled by ninety degrees between a first orientation in which apparatus 10 is propelled in the longitudinal direction (i.e., parallel with the longitudinal axis of frame 12) and a second orientation in which apparatus 10 is propelled side-to-side or in the lateral direction (i.e., parallel with the lateral axis 162 of frame 12).

Figure 3:
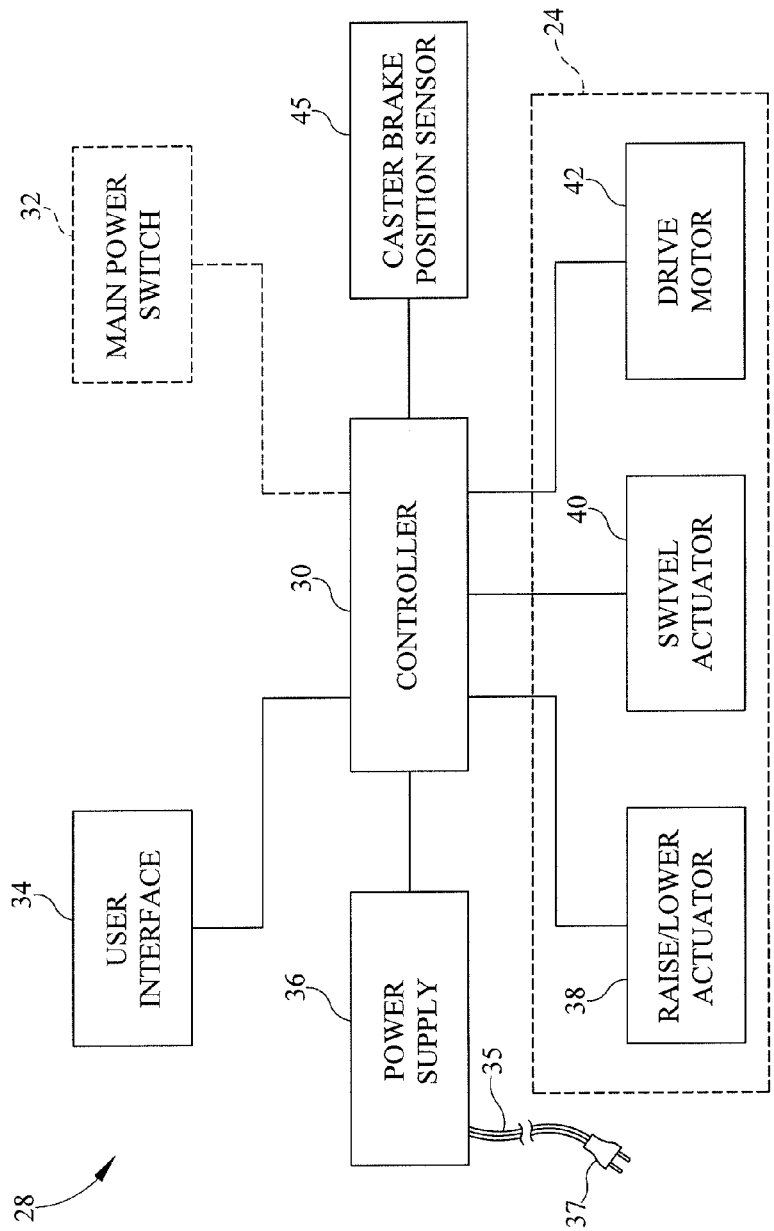
FIG. 3 is a block diagram of an electrical system of the person support apparatus of FIG. 1.

An electrical system 28 of the person support apparatus 10 shown in FIG. 3 includes a controller 30 and an optional main power switch 32. The electrical system 28 also includes one or more user interfaces 34 and a power supply 36. The electrical system 28 also includes raise/lower actuator 38, a swivel actuator 40, and a drive motor 42 which are all housed in the powered transport device 24. The electrical system 28 further includes a caster brake position sensor 45. The various components of the electrical system 28 are coupled to the controller 30. Controller 30 comprises logic-based circuitry such as a microprocessor, a microcontroller, a field programmable gate array, or even discrete logic gates or the like, along with all associated circuitry such as memory, analog-to-digital converters, digital-to-analog converters, input/output circuitry and so on. The circuitry of controller 30 may be located on a plurality of circuit boards or be included in various modules that couple. For example, controller 30 may include a logic controller portion which receives input signals regarding various conditions of apparatus 10 and a drive controller portion that is coupled to the logic controller portion and that controls voltage and/or current application to drive motor 42 and actuators 38, 40 of electrical system 28 in response to an output signal received from the logic controller portion. In those embodiments having main power switch 32, main power switch 32 is used to turn the powered transport device 24 on and off. In those embodiments without main power switch 32, then transport device may be on continually, although the system may power down into a sleep mode after a period of inactivity. In some embodiments, when off or when in the sleep mode, powered transport device 24 may have wheel 26 in a raised position spaced from the underlying floor.

As shown in FIG. 4, the one or more user interfaces 34 include user inputs, as will be further described below, that are engaged by a user to signal controller 30 as to the manner in which powered transport device 24 is to be operated. Power supply 36 comprises a battery, battery recharging circuitry, an AC power 37 cord 35 having an AC power plug 37, AC-to-DC conversion circuitry and other circuit components involved in powering the remainder of electrical system 28. Actuator 38 is operable in response to command signals from controller 30 to raise wheel 26 off of the underlying floor and to lower wheel 26 into contact with the floor. Actuator 40 is operable in response to command signals from controller 30 to swivel wheel 26 between the first and second orientations. Drive motor 42 is operable in response to command signals from controller 30 to rotate wheel 26 thereby to propel apparatus 10 along the floor.

Assuming controller 30 receives signals from user interface 34 indicating that a user desires powered transport of apparatus 10, controller 30 determines whether other conditions are met prior to activating the drive motor 42 to drive wheel 26. For example, controller 30 may first determine that battery power of power supply 36 meets or exceeds a threshold level and may determine whether the casters are not in brake mode before applying power to drive motor 42 to rotate wheel 26. A caster brake position sensor 45 provides a signal to controller regarding whether casters are braked or released. Contrary to the teachings of all known prior art patient support apparatuses that have powered transport devices and that have AC power plugs 37, controller 30 does not require that the power plug of power supply 36 of apparatus 10 be unplugged prior to applying power to drive motor 42 to rotate wheel 26 to propel apparatus 10 along the floor. This creates the possibility that apparatus 10 can be power driven with the power plug still plugged into an electrical outlet resulting in the power plug being ripped out of the electrical outlet as apparatus 10 is driven away. However, by allowing drive motor 42 to be driven even when the AC power plug 37 is plugged into an electrical outlet, powered transport device 24 can be used to make minor adjustments in the positioning of apparatus within its location. This is especially useful when obese or morbidly obese (also known as, bariatric) patients are supported on apparatus 10.

User interface 34 at the head end of apparatus 10 includes a pair of first switches 44, shown in FIGS. 1 and 4, that extend from distal ends 46 of hand grips 48 of respective push handles 50 that are coupled to upper frame 14. Two switches 44 must be activated to enable the powered transport device 24 to operate the drive motor 42. User interface 34 at the head end of apparatus 10 further includes a load cell that is situated within an interior region of the associated push handle 50 as is known in the art.

A user applies a force to push handles 50 by pushing on the hand grips 48 in the direction of arrow 170 or pulling on the handle in the direction of arrow 172. Load cell 52 is fixed to upper frame 14. Movement of the push handle 50 acts on load cell 52 causing deflection of load cell 52 which is sensed by a strain gage in load cell 52, as is well known in the art.

Figure 5:
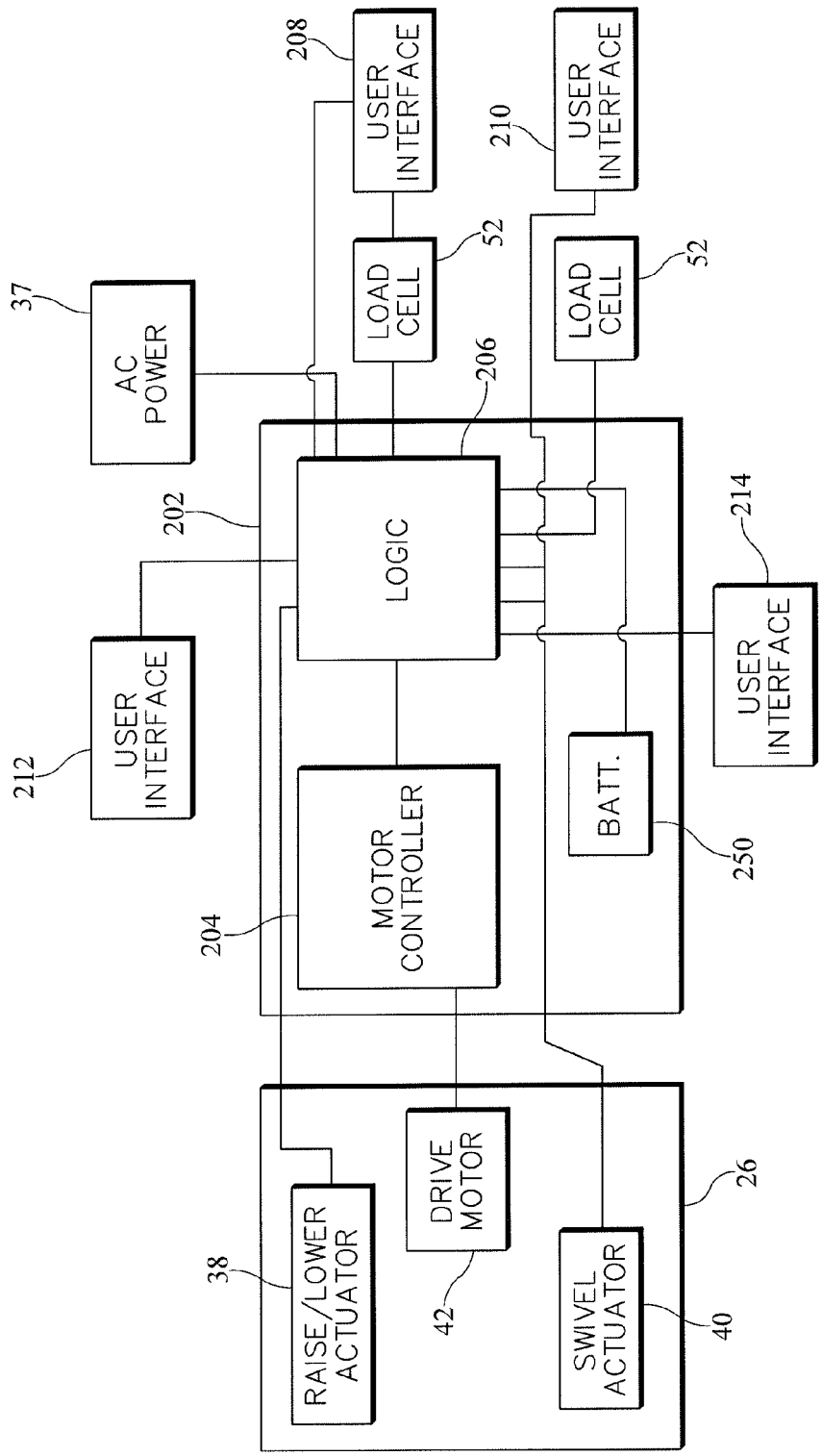
FIG. 5 is a block diagram of a portion of the control system of the person support apparatus of FIG. 1.
Figure 6:
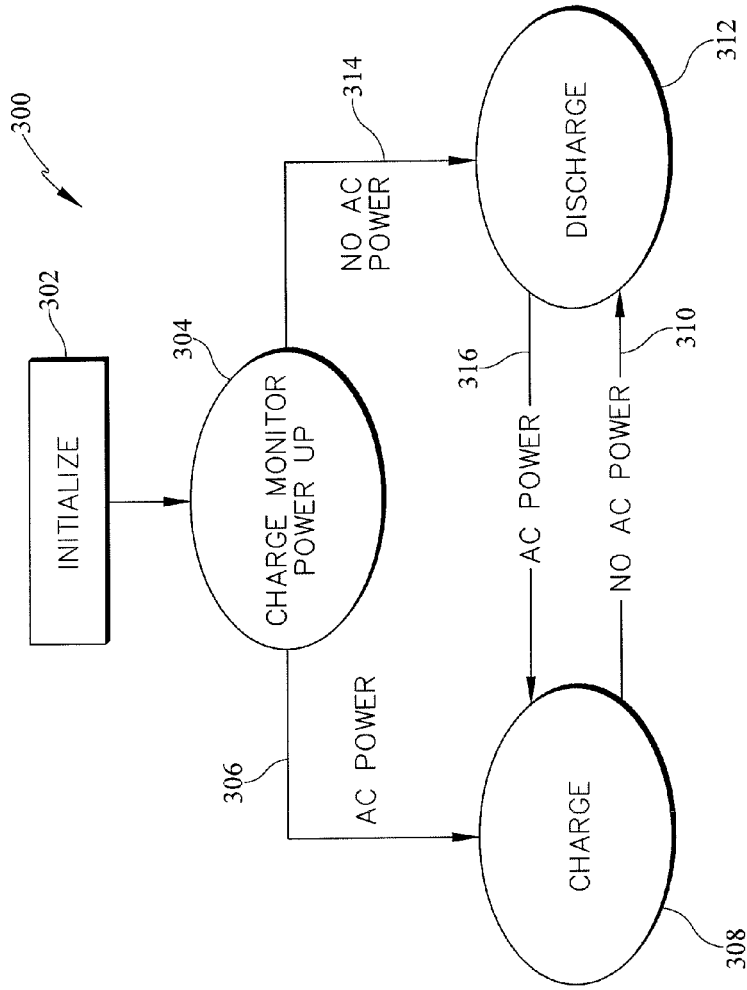
FIG. 6 is a state diagram of a charging process for charging the batteries of the person support apparatus of FIG. 1.
Figure 7A:
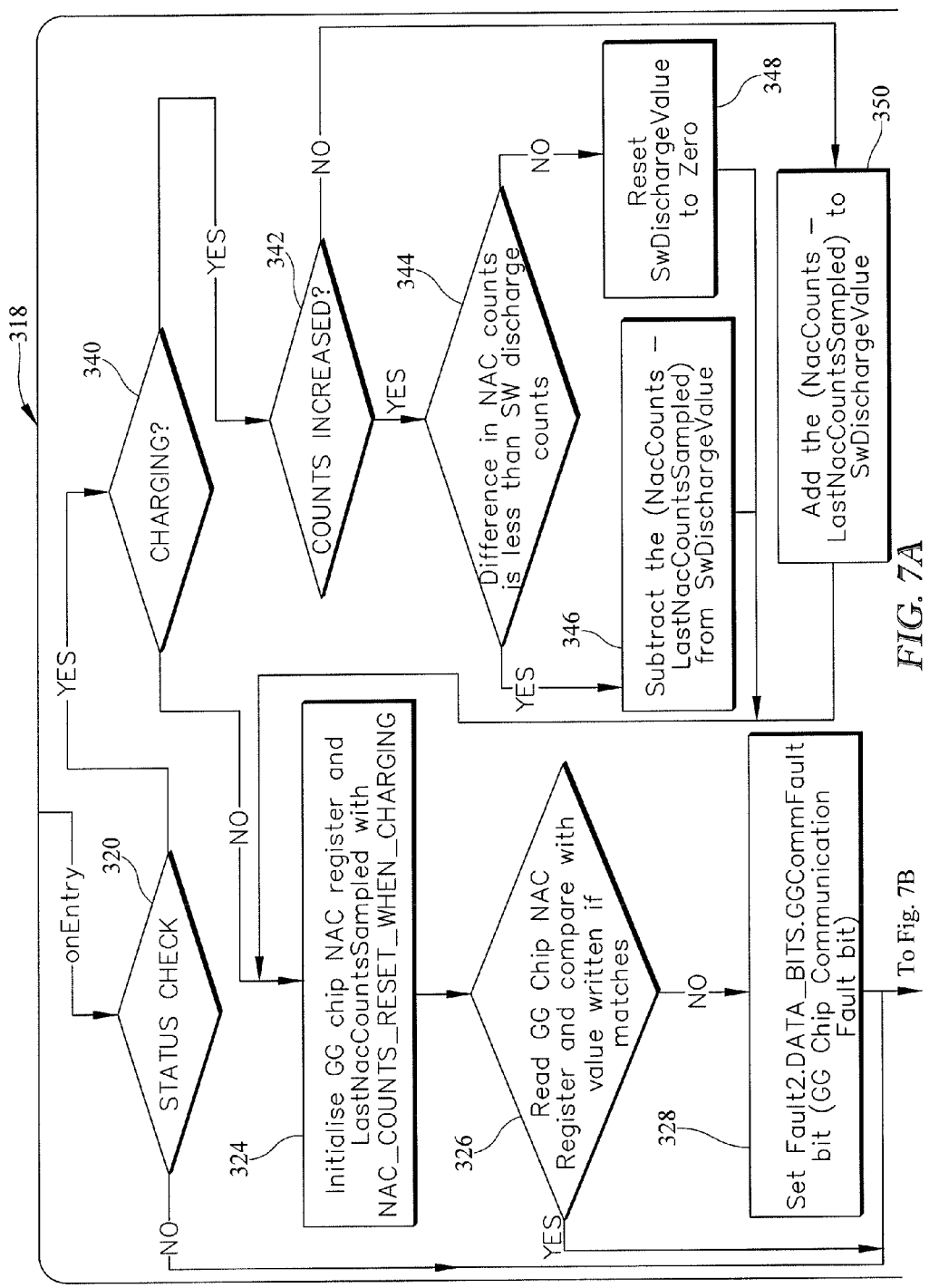
FIGS. 7A-7B show a flow-chart of a control process for monitoring and charging a battery for the patient-support apparatus of FIG. 1 when the battery charging system is in a charging state.
Figure 7B:
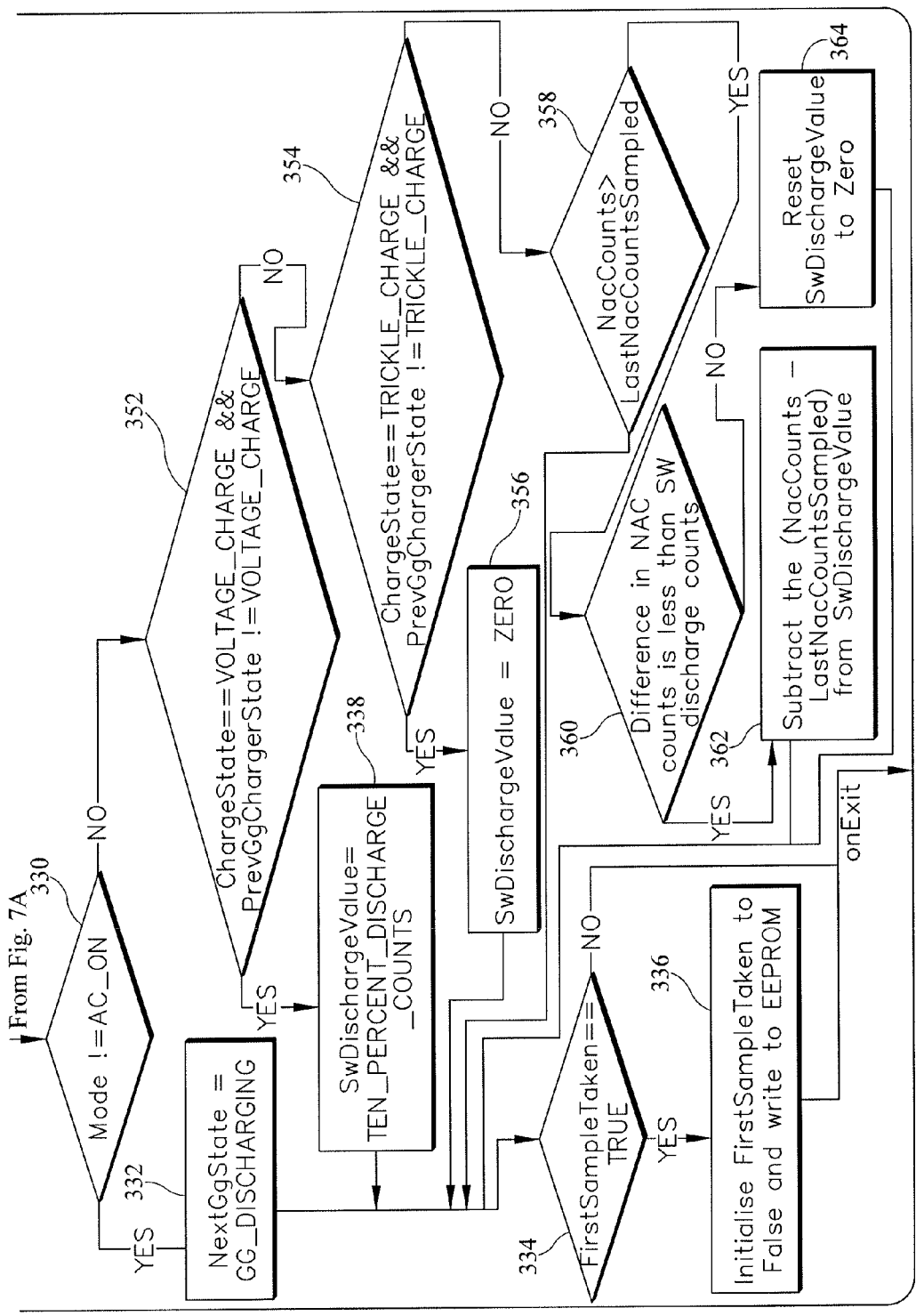
Figure 8A:
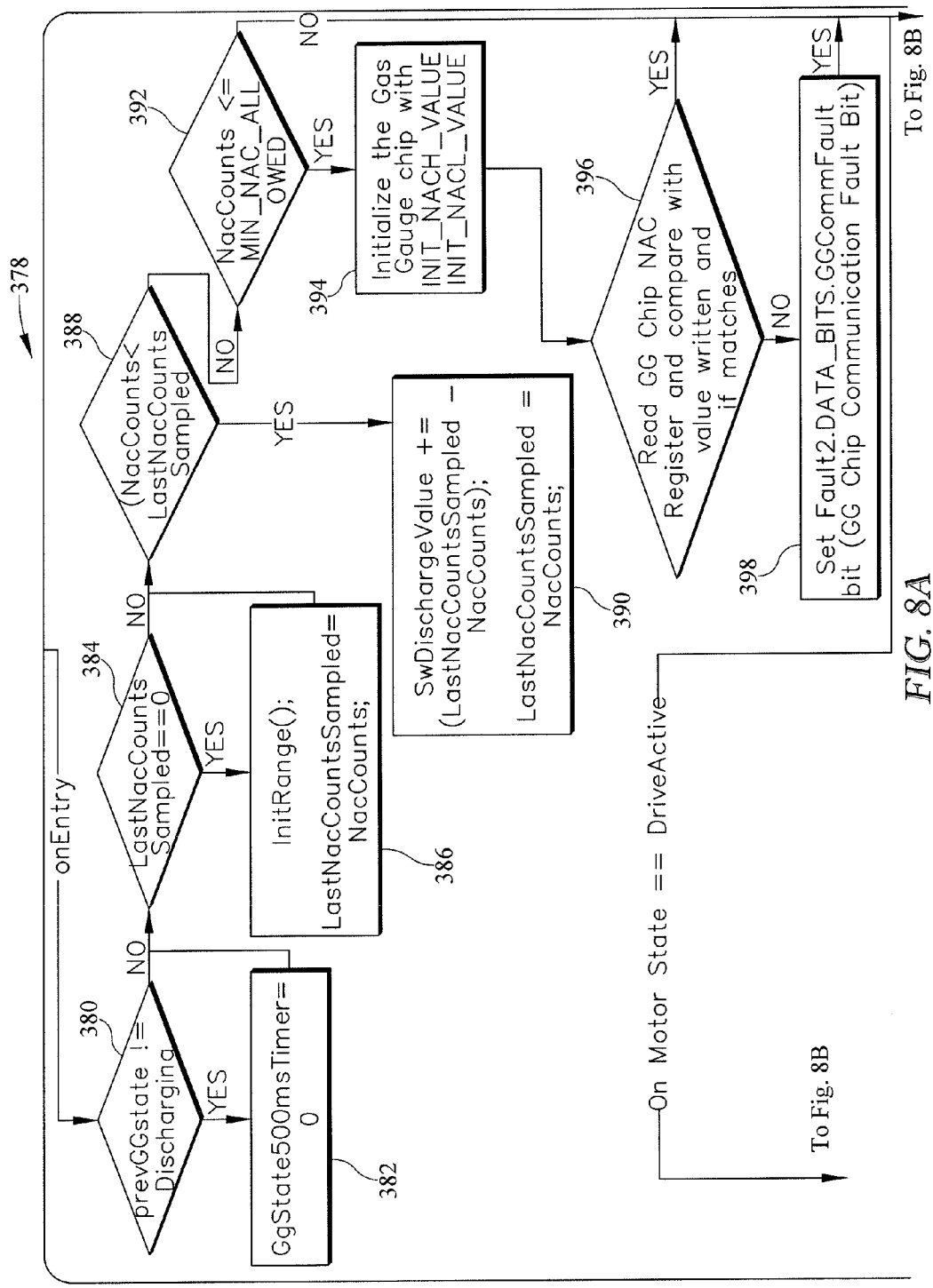
FIGS. 8A-8B show a flow chart of a control process similar to FIGS. 7A-7B, the flow chart of FIGS. 8A-8B illustrating a process used when the system is in a discharging state.
Figure 8B:
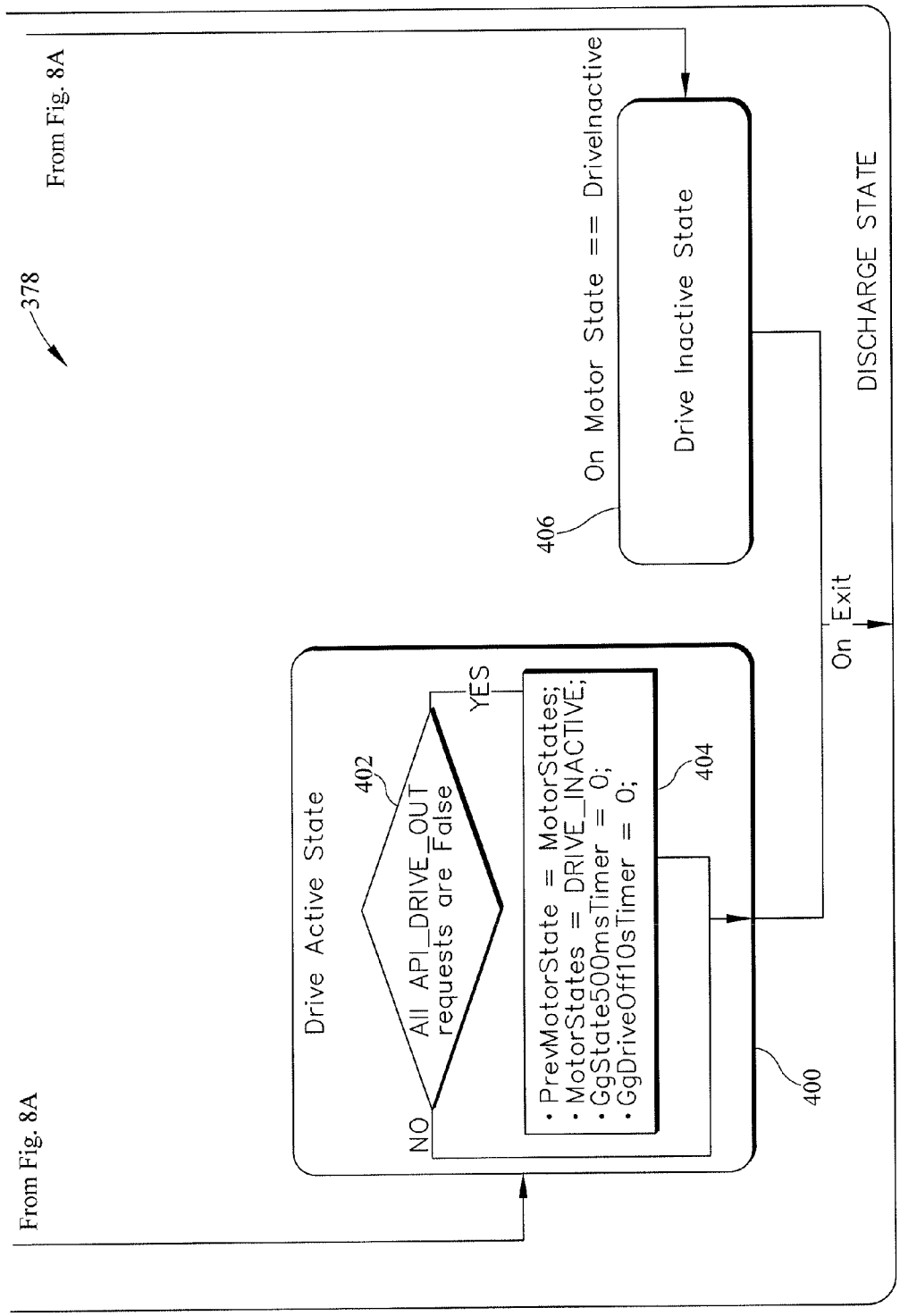
Figure 9A:
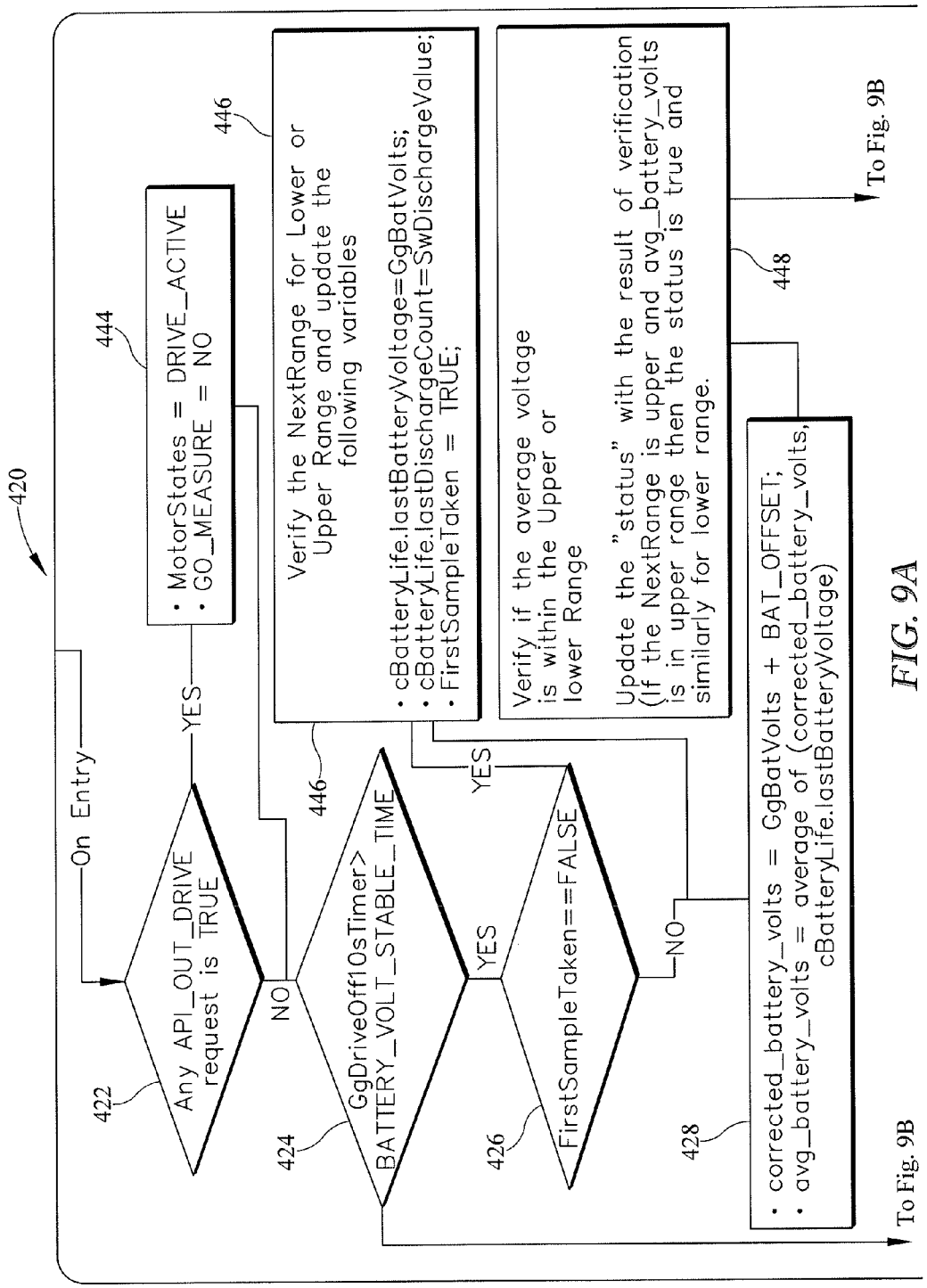
FIGS. 9A-9C show a flow chart of a control process similar to FIGS. 7A-7B and 8A-8B, the flow chart of FIGS. 9A-9C illustrating a process used when the system is in an inactive state.
Figure 9B:
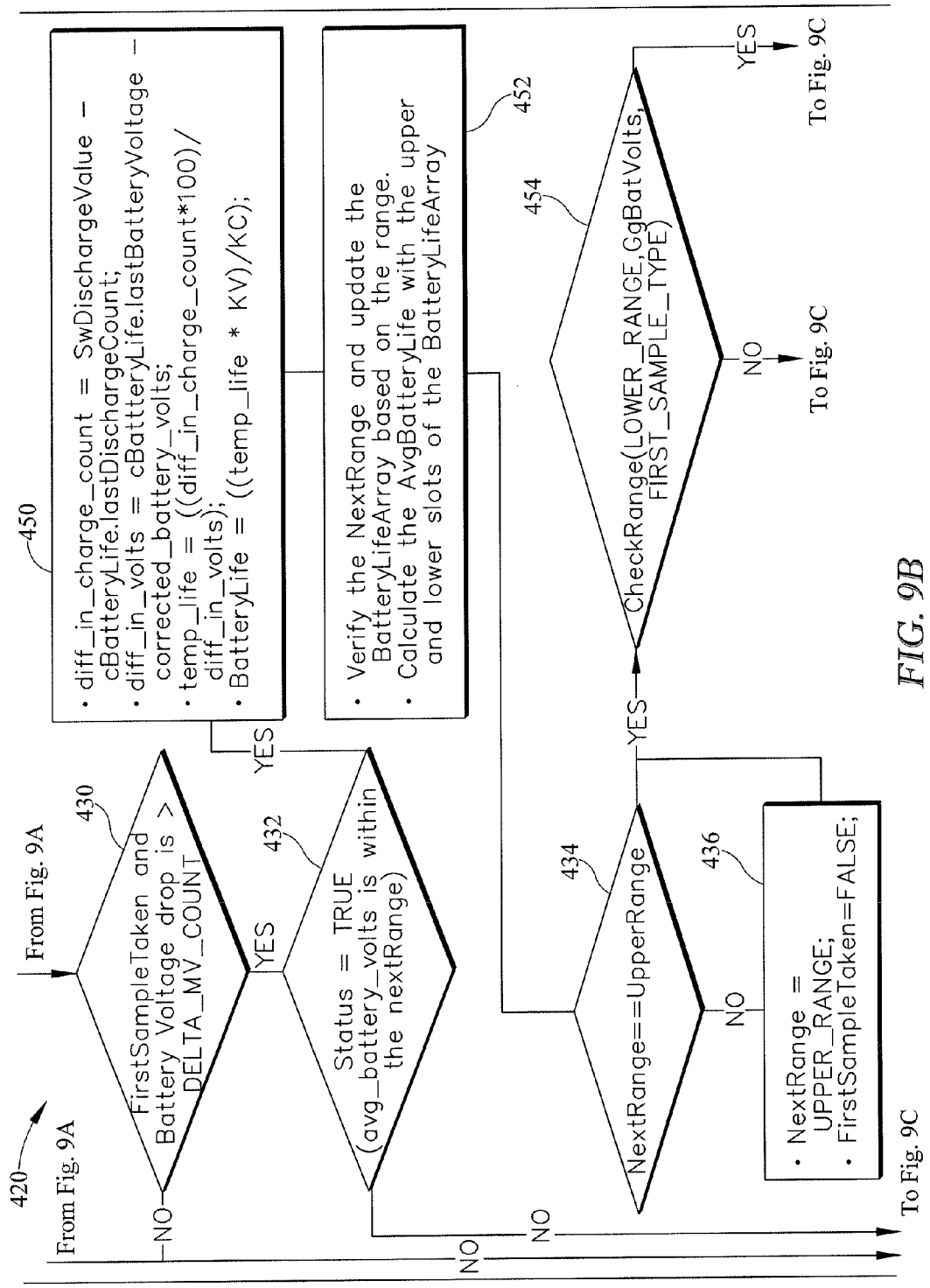
Figure 9C:
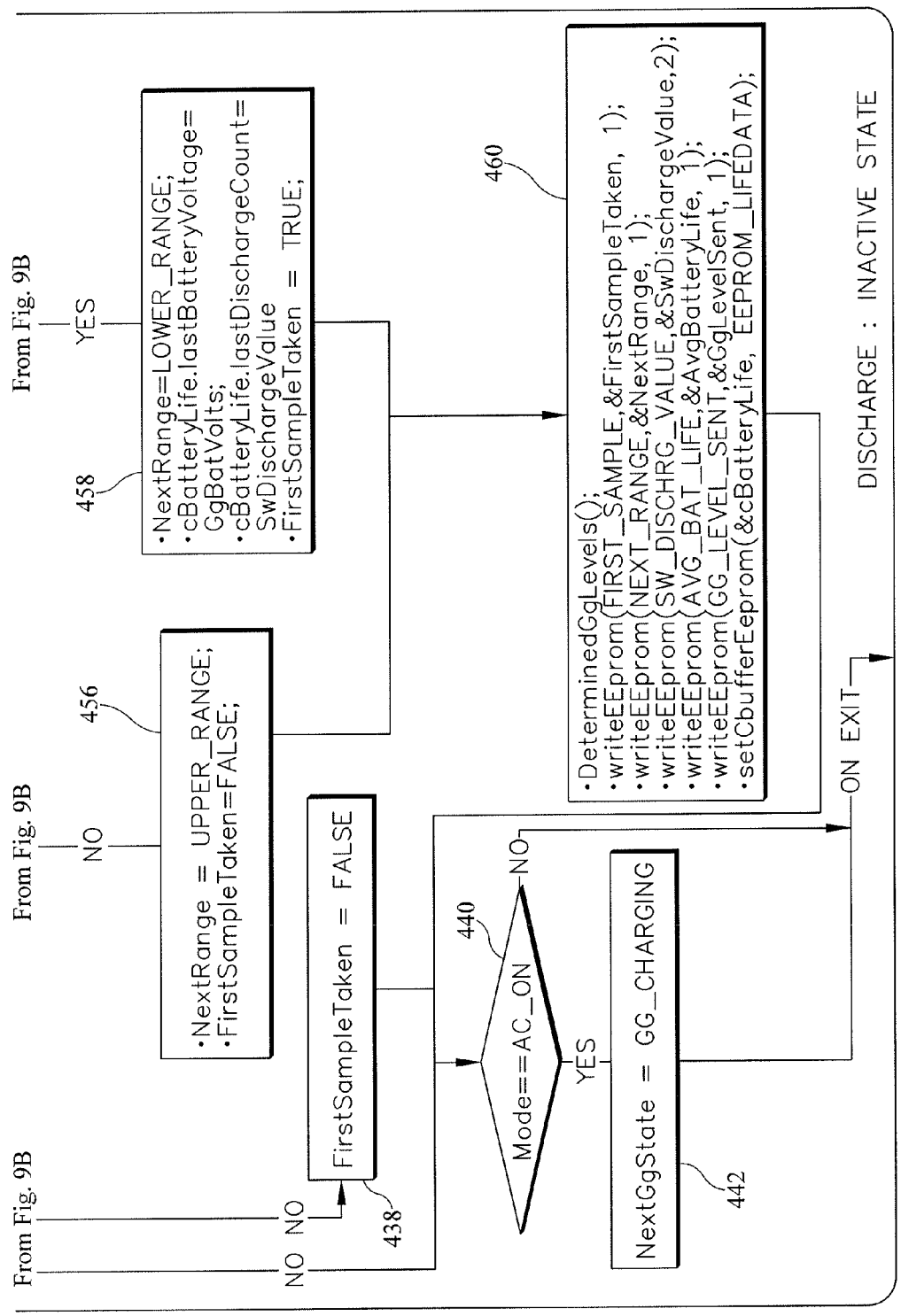
Figure 11:
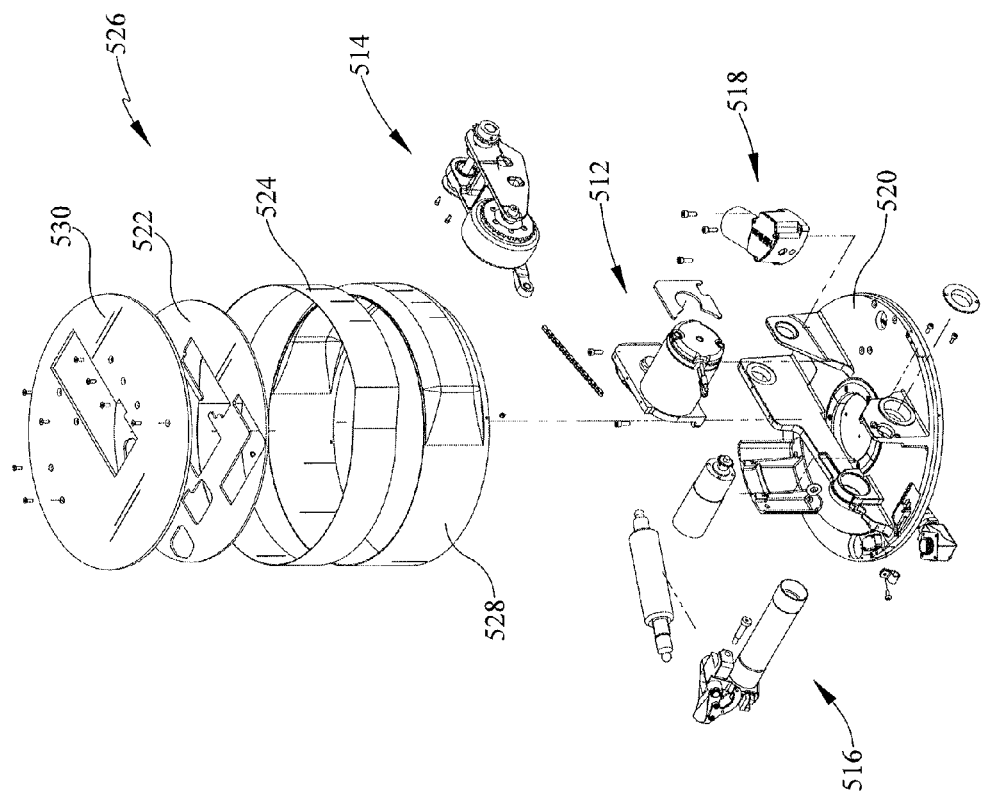
FIG. 11 is an exploded perspective view of a portion of a powered transport device.

In the illustrative embodiment of FIG. 5, a block diagram of one embodiment of an electrical system 200 of a support apparatus embodying the control methods of the present disclosure is shown. A controller 202 includes a motor controller 204 and logic circuitry 206. The logic circuitry 206 receives inputs from two user interfaces 208 and 210 positioned at the head end of the apparatus 10 and from user interfaces 212 and 214 positioned at the sides of the apparatus 10. The user interfaces 208, 212 are configured to allow a user to choose various control parameters of the apparatus 10 to control operation of the drive wheel 26. The electrical system also includes two load cells 52 which are used to provide a force sensor for determining an input signal for the desired speed that a user would like to operate the associated powered transport apparatus. The electrical system 200 may be connected to AC power 37. The AC power 37 may charge batteries 250 which are used to power the electrical system 200 when the AC power is not connected.

A charge monitoring and management system 300 varies operation based on the state of the various parameters of the electrical system 200. A state diagram shown in FIG. 10 provides an overview of the operation of the system 300. Upon start-up of the electrical system 200 at step 302, the charge monitoring and management system 300 transitions to a power up state 304 where various parameters of the charge monitoring and management system 300 are initialized. The system 300 determines if the electrical system 200 is receiving AC power 37. If AC power 37 is available, the system 300 transitions from the power up state 304 to the charging state 308 as indicated by transition 306. If the electrical system is not receiving AC power 37, the system 300 transitions from the power up state 304 to the discharging state 312 as indicated by transition 314. The charge monitoring and management system 300 may periodically power up from a sleeping condition in order to check operating parameters. When the system 300 is in the discharging state 312 the system 300 monitors for the presence of AC power 37 to the electrical system 200. If AC power 37 is detected, then the system 300 transitions from the discharging state 312 to the charging state 308 as indicated by transition 316. If the system 300 is in the charging state 308 and the loss of AC power 37 is detected, the system 300 transitions to the discharging state 312 as indicated by the transition 310.

The system 300 operates differently in the charging state 308 than in the discharging state 312. The presence of AC power 37 to the electrical system 200 provides a source of power for the system 300 to charge the batteries 250 of the transport system 100. If there is no AC power 37 available, then the system 300 must monitor consumption of the charge of the batteries 250 and provide feedback to a user if the charge falls below an acceptable level. The system 300 includes a software based charge monitor which determines an expected discharge of the batteries to determine a battery life remaining and to determine various charging parameters. In addition, the system 300 is operable to continuously measure the voltage of the batteries and compare the changes in the voltage to the charge monitor to determine operating characteristics of the battery including the degradation of the life of the battery.

A control process 318 controls the charging of the batteries 250. Upon entry into the process 318 the system 300 evaluates the previous state and charge level at a decision step 320. If the state of system 300 was the charging state 308 and the charge count of the batteries 250 is greater than or equal to the maximum charge count level allowed by the system 300, the control process 318 branches to a second decision step 340 which will be discussed in further detail below. If the charge count of the batteries 250 is lower than the maximum charge count allowed, then the control process 318 advances to a decision step 330 to determine if the system is receiving AC power 37. If the system is not receiving AC power 37, then the control process 318 advances to decision step 352. If the system is receiving AC power 37, then the control process 318 advances to process step 332 where the state of the charging system is set to discharge. Then the control process 318 advances to decision step 334 where it is determined if a flag indicating a sample has been taken is set. If not, the system exits the control process 318. If the sample taken flag is set, the control process 318 advances to step 336 where the system the flag is cleared and the control system exits the process.

If the system is not receiving AC power 37, the control process 318 advances from step 330 to decision step 352 to determine if the both the previous charge state and the current charge state are set to a normal charge rate. If so, the control process 318 advances to step 338 where the software discharge value is set to 10% of maximum charge. The control system then advances to decision step 334 discussed above.

If both the current and previous charge states are not both set to the normal charge rate, then control process 318 advances to decision step 354 to determine the state of the system. If the system has been in a trickle charge state with both the previous charge state and current charge state set the trickle charge, the control process 318 advances to step 356 where the software discharge value is set to zero. The control system then advances to decision step 334 discussed above.

If the system has not been in a trickle charge, the control process 318 advances from step 354 to decision step 358 where available charge currently available is compared to the available charge that was available in a previous sample. If the available charge is not greater than the previously available charge, then the control process 318 advances from step 358 to step 334 discussed above. If the current charge is greater than the previous charge, the control process 318 advances to decision step 360 where the difference in the current charge and previous charge is compared to the amount of discharge calculated by the software. If the increase in actual charge is greater than the software calculated charge, then the control process advances to step 362 where the difference between the current charge and the previous charge is subtracted from the software discharge calculated. The control process 318 then advances to decision step 334 as discussed above. If the change in charge from the previous sample is not less than the software calculated discharge, then the software discharge is set to zero at step 364 and the control process 318 advances to decision step 334.

If the control process 318 determines that the system is charging and the charge is greater than a maximum threshold at step 320, then at step 340 control process 318 evaluates if the prior state was the charging state. If not, then the process 318 advances to step 324 to begin a diagnostic analysis. At step 324, the charge monitoring register is set to a pre-set value. At step 326, the pre-set value is read to determine if the read value equals the written value. If it does, the control process 318 advances to decision step 330 discussed above. If the read value does not match the written value, then at step 328, a communication error flag is set by the system. The control process 318 then advances to step 330.

If it is determined at step 340 that the system is in the charging state, then the control process 318 advances to decision step 342 where the current sensed charge is compared to the previous sensed charge. If the current sensed charge is not greater than the previously sensed charge, then the control process 318 advances to step 350 where the difference in the current and previous charges is added to the charge monitor and the control process 318 advances to step 324 discussed above. If the current sensed charge value is greater than the previously sensed charge value, then the control process 318 advances to decision step 344 where the difference in sensed charge values is compared to the amount of discharge calculated by the charge monitor. If the sensed value is less than the discharge calculated by the charge monitor, then the difference is subtracted from the charge monitor value at step 346 and the control process advances to step 324.

If the difference in sensed charge values is not less than the amount of discharge calculated by the charge monitor at step 344, then the charge monitor discharge value is set to zero at step 348. The control process 318 then advances to step 324 as discussed above.

A separate control process 378 is invoked when the system is in the discharging state 312. Upon entry to the discharge state 312, the control process 378 determines if the previous state was the discharging state 312. If not the control process 378 advances to a decision step 384. If the previous state was the discharging state, the state timer is set to 0 at a process step 382 and the control process 378 advances to the decision step 384.

At step 384, the system evaluates the previous charge level to determine if there was any charge in the batteries. If there was a charge, the control process 378 advances to decision step 388. If there was no charge, the control process 378 sets the variable for the previously sensed charge to the current charge level at step 386 and advances to decision step 388.

At decision step 388, the current charge level is compared to the previous charge level. If the current charge level is not less than the previous charge level, the control process 378 advances to decision step 392. If the current charge level is less than the previous charge level, the charge monitor is set to zero discharge and the control process 378 sets the variable for the previously sensed charge to the current charge level. The control process 378 then advances to decision step 392.

At decision step 392 it is determined if the current charge is below a minimum threshold level. If it is, then the charge monitor is set to an initial value at step 394. If it is not, then the control process 378 advances to the appropriate state related to drive activity. Once the charge monitor is set to the initial value at step 394, the control process 378 advances to a decision step 396 to test the communication of charge information. At decision step 396, the initial value of the charge monitor is read and compared to the value written in step 394. If the value matches, control process 378 advances to the appropriate state of drive activity. If the value does not match, then at process step 398, a communication fault flag is set and the control process advances to the appropriate drive activity state.

If the drive motor is inactive, the control process 378 sets the drive to the drive inactive state 406 and exits. If the drive motor is active, then the control process 378 advances to the drive active state 400 and at a decision step 402 checks the to see if any inputs are being received from the various user inputs. If none are being received, then the control process 378 exits. If drive inputs are being received as determined by decision step 402, then various drive related variables are set at step 404 based on the inputs.

While the drive system is in the inactive state 406 as a sub-state of the charge monitor discharge state 312, the charge monitor operates a control process 420 to control the charging of the batteries. Upon entry into the control process 420, the state of drive requests is determined. If drive requests from user inputs are true, the control process 420 advances to step 444 and sets the drive active flag and advances to decision step 424. If no drive requests are being made, the control process 420 advances to decision step 424 directly.

At decision step 424, it is determined if the time that the charge monitor has been off exceeds a battery stability time period. If it has not, the control process 420 advances to a decision step 440 which will be discussed in further detail below. If the stability time period has been exceeded, then the control process 420 advances to decision step 426 where it is determined if a first battery charge sample has been taken. If it has not, then the control process 420 advances to a step 446 where variables for the battery voltage and the software discharge value for the charge monitor are used to set respective battery charge values. Also at step 446, a flag for having taken a first sample is set to true. The system then advances to a process step 428. If the first sample is determined to have already been taken at decision step 426, then the control process 420 would advance directly to step 428.

At step 428, the battery voltage is corrected to account for an offset constant. The corrected battery voltage and the previous value for the battery voltage are then averaged. Control process 420 then advances to process step 448 where the average is compared to an appropriate range. Each cycle through the control process 420, the range of the battery voltage is verified. The upper range is between 36.75 volts and 37.75 volts. The lower range is between 35.00 and 36.50 volts. If the voltage is in the right range, then the status of the verification is out of process step 448. Otherwise, the status is set to false.

Control process 420 then advances to decision step 430 where the battery voltage drop is evaluated against a threshold. If the battery voltage drop is too great, then the control process 420 advances to decision step 432. If the voltage drop is acceptable, then the control process advances to step 440. At decision step 432, if the status determined in step 448 is true, then various parameters of the charge monitor are set at process step 450 and the control process 420 advances to step 452. In step 452, the proper range is verified and the battery life calculation is updated based on the current information regarding the average voltage in the battery. This calculation is done based on the rate of change of voltage over time. As a battery degrades, variations in the rate of voltage change indicate the expected life of the patent. Increasing rates of discharge indicate shortened battery life.

The control process 420 advances from step 452 to decision step 434. Steps 434, 436, 454, 456, 458, and 460 cooperate to set the various variables determined regarding the battery life by reading the current battery voltage and setting the software discharge calculation values to be used as discussed above.

Referring now to FIG. 10, a control module 500 of a powered transport device according to the present disclosure includes a housing 502 and a cover 504 which cooperate to form an enclosure 506 to enclose various components of the powered transport device control module 500. In the illustrative embodiment, the control module 500 includes three batteries 508, 508, 508 and a logic assembly 510. A motor 512 is driven by the logic assembly 510 to drive a motor 516 to deploy a powered wheel 514. The powered wheel 514 is driven by a motor 512 which includes an enclosed chain for driving the wheel 514. Another motor 518 swivels a support plate 520 which supports the powered wheel 514 to change the direction of orientation of the powered wheel 514.

The powered wheel 514 is carried by an assembly 526 which is enclosed by a housing 528 which mounts to the plate 520 with a cover 530. The assembly 526 further includes a noise dampening member 524 which fits within the housing 528 and serves to suppress the noise of the operation of the powered transport device. In addition, a cover 522 engages the cover 530 and further serves to dampen the noise of the powered transport device.

The control process shown in FIGS. 12-20 discloses a method of controlling the speed of a powered wheel of a powered transport device to respond to variations in the slippage of the wheel relative to the ground over which the wheel is moving. This permits the wheel to control the speed regardless of the underlying ground conditions such that rolling resistance may be overcome.

Figure 12:
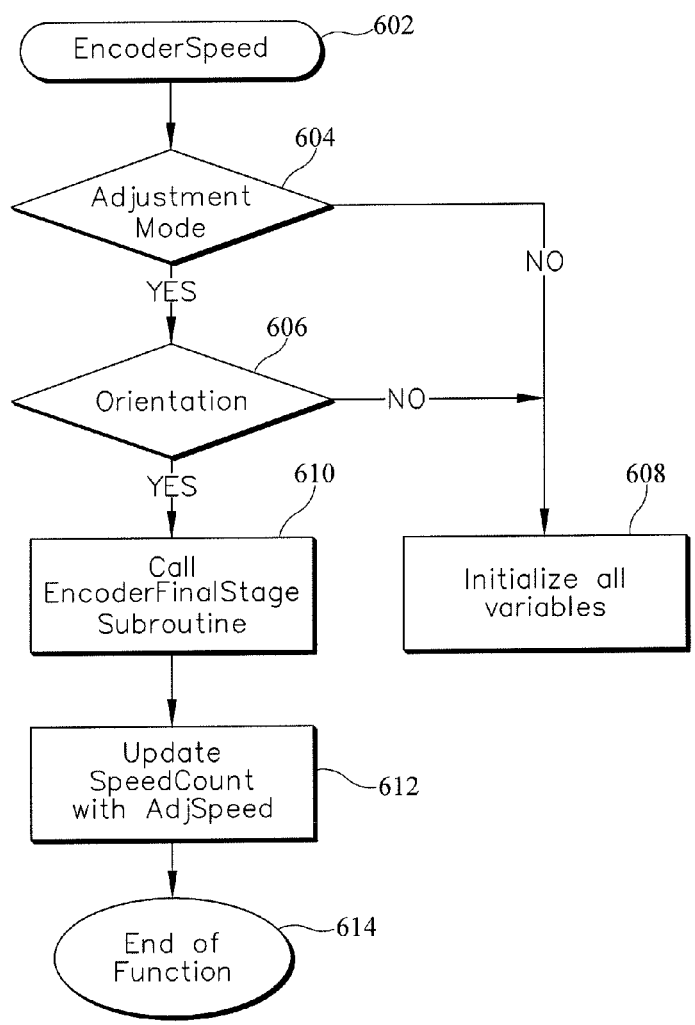
FIGS. 12-20 are block diagrams of a process used to monitor the actual speed of a drive wheel of a powered transport system and a comparison of the actual speed to the desired speed to modify an output of control system to compensate for losses in the system.
Figure 13:
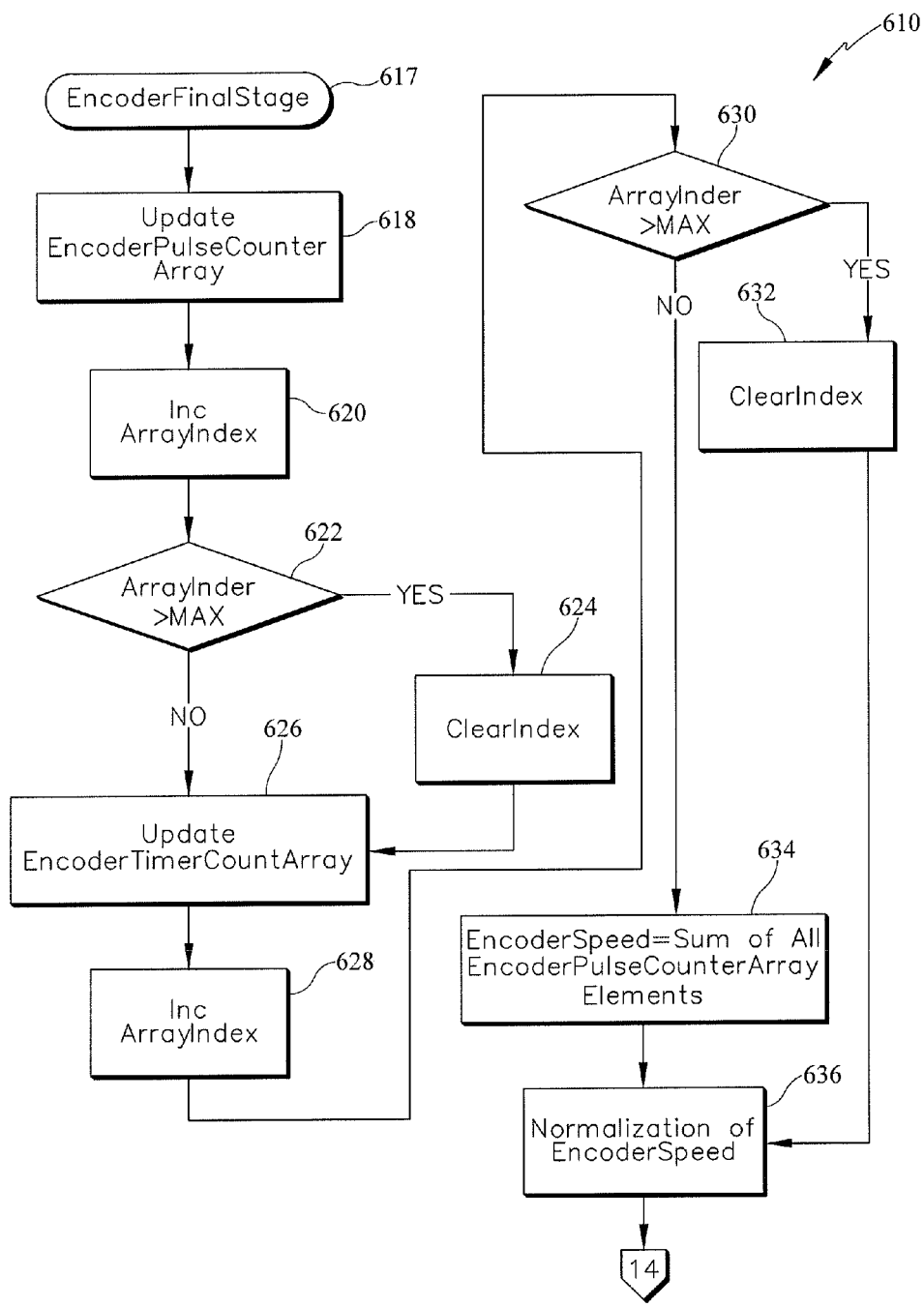
Figure 14:
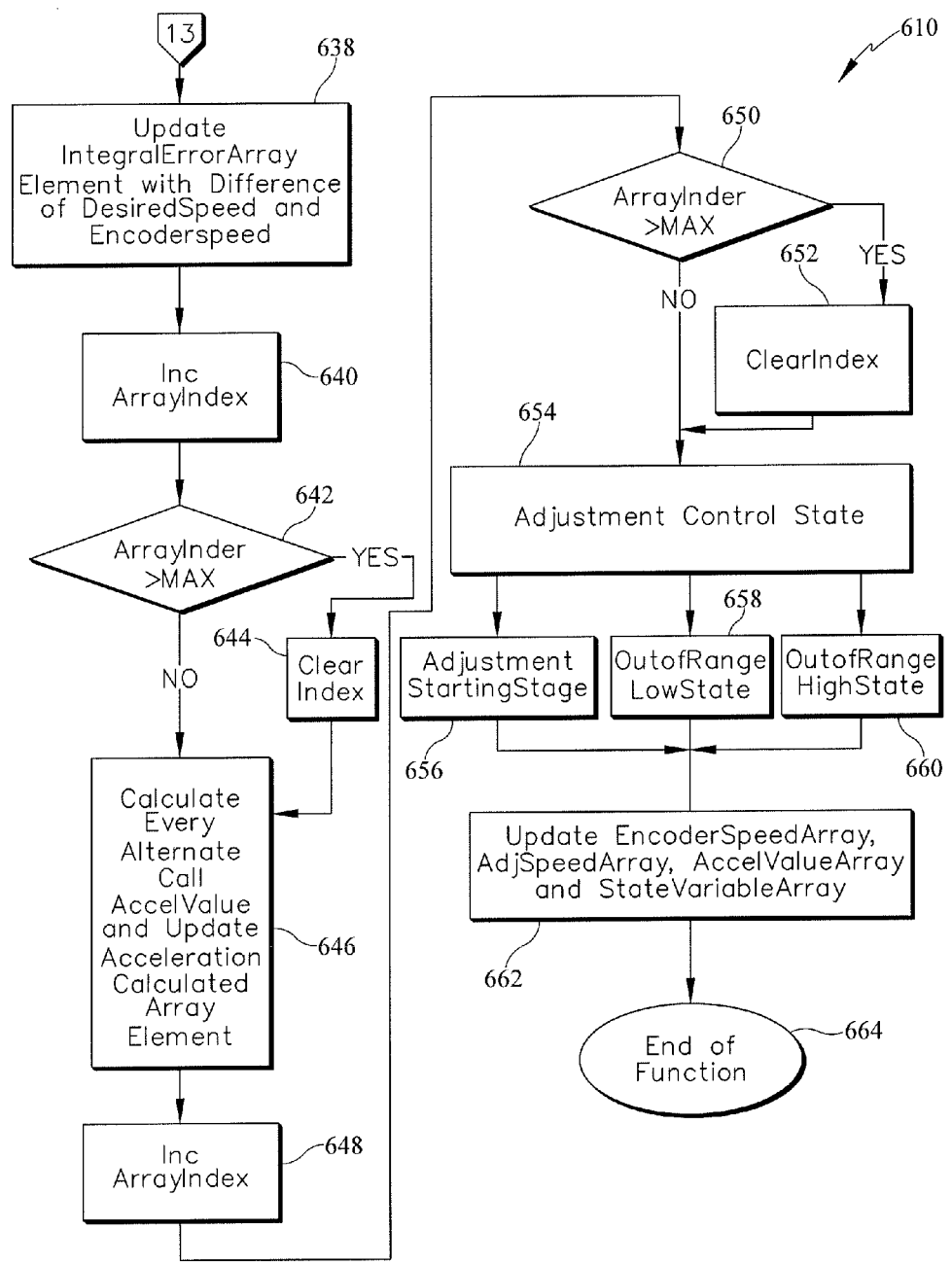
Figure 15:
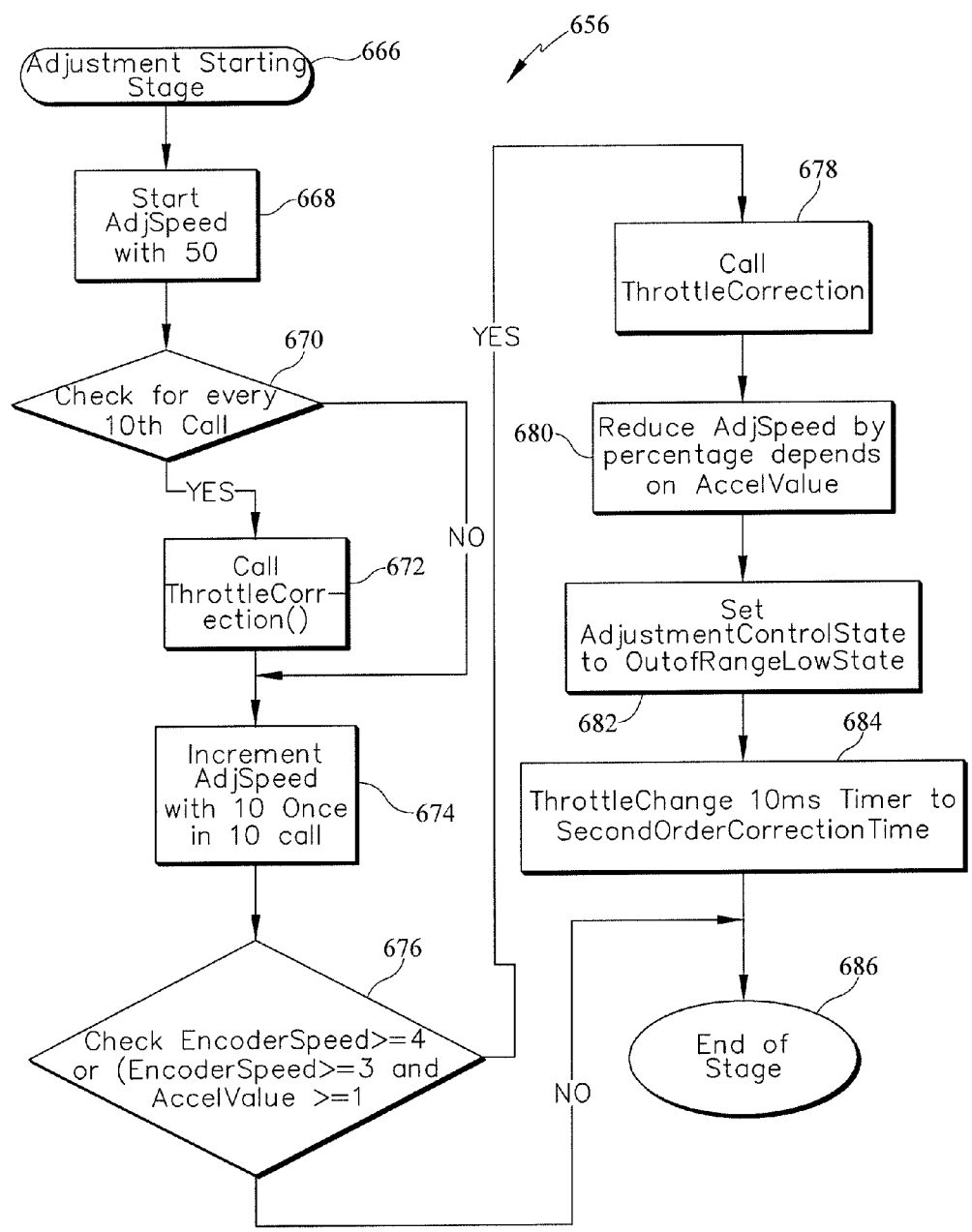

During steady-state operation of the powered transport device 24, the controller 202 calls an encoder speed process 600 every 500 ms. Referring now to FIG. 12, upon entry into the encoder speed process 600 at step 602, the controller 202 determines whether or not the powered transport device is in a speed adjustment mode at decision step 604. If the powered transport device 24 is not in a speed adjustment mode, the encoder speed process 600 advances to step 608 where the encoder speed process 600 variables are initialized. If the powered transport device 24 is in an adjustment mode at step 604 the encoder speed process 600 advances to decision step 606. At decision step 606, it is determined whether powered transport device 24 is oriented with the casters in the direction of travel. If powered transport device 24 is not oriented, encoder speed process 600 advances to step 608 where encoder speed process 600 variables are initialized. Because encoder speed process 600 is operable under steady state conditions, a lack of orientation of the casters will cause the encoder speed process 600 to function erratically. If it is determined that powered transport device 24 is oriented at decision step 606, encoder speed process 600 advances to step 610 where and encoder final stage process 616 is called.

In the encoder final stage process 616, the controller 202 adjusts the output to the motor controller 204 to compensate for any rolling resistance that may be encountered by the powered transport device 24. For example, if patient support apparatus 10 is moved to an incline, drive motor 42 that drives the drive wheel 26 will be straying such that the speed of rotation of the drive wheel 26 will be reduced because of the additional load experienced by the drive motor 42. This is one example of a rolling resistance experienced by the powered transport device 24. If the rolling resistance becomes large enough, the drive wheel 26 may lose grip such that there is slipping between the drive wheel 26 and the surface on which the patient support apparatus 10 is being driven. The encoder final stage process 616 monitors an encoder of the drive motor 42 to monitor the rotation of the drive wheel 26 and modify the operation of the drive motor to compensate for increases or decreases in a rolling resistance. By comparing the rotation of drive will 26 to the power signal provided by the motor controller 204, the controller 202 modifies the operation of the drive motor 42 through the motor controller 204 to vary the output from the motor controller 204. Through this closed loop modification of the output from the motor controller 204, the powered transport device 24 maintains a near constant ground speed at a given deflection of the load cell 52. Utilizing the closed loop control, the controller 30 provides automatic adjustments such that a user does not have to modify the pressure placed on the hand grips 48 to maintain a desired speed of the patient support apparatus 10.

Upon entering the encoder final stage process 610 at step 617 the encoder final stage process 610 advances to a process step 618 where an array of encoder pulse counts is updated. The encoder pulse count array is an accumulation of encoder pulse counts over a period of time such as 100 ms. The encoder final stage process 610 to process step 620 where an index of pulse count samples is incremented. If the pulse count array is greater than a maximum allowed count in the array as determined at decision step 622, then the array is cleared at process step 624. If the pulse count array is determined to be acceptable at decision step 622, then the encoder final stage process 610 advances to process step 626 where the encoder timer counter array is updated. The value of this array is the total time period over which the encoder pulse count algorithm has been accumulated. At process step 628, the array index is incremented to monitor the amount of data placed in the array. At decision step 630, the array index is compared to a maximum. If the maximum is exceeded, the index of data is cleared at process step 632. If the maximum is not exceeded, a variable EncoderSpeed is determined at process step 634 with the value of EncoderSpeed being set as the sum of all encoder pulse counter array values. The process then advances to process step 636 where the value of EncoderSpeed is normalized. In one particular embodiment, the normalization includes setting the EncoderSpeed variable to an adjusted value by multiplying the sampled value of EncoderSpeed by a constant and dividing the product by the total time that the value of EncoderSpeed was gathered. For example, the EncoderSpeed may be normalized to a value of 125% of the actual sampled value. This approach may be used to account for limitations in the sampling of the encoder pulses. Of course, other values may be used as an adjustment value depending on the response of the particular system to which this approach is being applied.

Once the value of a normalized EncoderSpeed is determined, the final stage process advances to process step 638 where an integral error array is updated by accumulating the difference of a DesiredSpeed variable and the EncoderSpeed variable into the array. The DesiredSpeed value is the speed value that corresponds to the input signal received from the load cells 52. Once an element is added to the array, the array index is incremented at process step 640. The array index is evaluated at a process step 642 to determine if the index exceeds a maximum allowable number of elements in the array. If the index is excessive, the index is cleared at process step 644. In either case, the final stage process advances to process step 646 where the acceleration actually being experienced by the powered transport device 24 is accumulated. This is determined by comparing the current EncoderSpeed variable to the previous value of the EncoderSpeed variable and accumulating the difference between the values. At process step 648 the acceleration array index is incremented. At decision step 650, the size of the array is compared to a maximum value. If the size of the array exceeds the maximum value, the index is cleared at process step 652.

The encoder final stage process 610 then advances to process step 654 to determine what adjustment control state the controller 202 is experiencing. If the adjustment control state corresponds to an adjustment starting stage, then the adjustment starting stage process 656 is called by the encoder final stage process 610. Upon starting the starting stage process 656 at step 666, the value of a variable AdjSpeed is set to a fixed count. In the illustrative embodiment, the output value is 50 counts. The starting stage process 656 then advances to a decision step 670 where it is determined if the starting stage process 656 has been called 10 times. If not, then the starting stage process 656 advances to a process step 674. However, if the process 656 has been called 10 times, then the process advances from decision step 670 to process step 672 where a throttle correction process 658 is invoked at process step 672.

The throttle correction process 658 advances from entry step 768 to a decision step 770 where it is determined if the value of a variable timer variable PreviousThrottle 10 ms is less than or equal to 40 counts. If it is not, then the process 658 advances to process step 780 where the value of the PreviousThrottle 10 ms timer is set to zero. The value of a variable PrevAdjSpeed is then set to equal the current AdjSpeed at a process step 782 and the process returns to the calling step at an end of function step 784. However, if the value of the PreviousThrottle 10 ms Timer is less than or equal to 40 counts, the process 658 then advances to process step 772 where the time elapsed since the last operation of the process 658. The process then advances to process step 774 where a new value for AdjSpeed is calculated by using the PrevAdjSpeed variable and the elapsed time to determine an adjusted speed. The PreviousThrottle 10 ms Timer is then set to zero at process step 776. Finally, the PrevAdjSpeed variable is set to equal the current newly calculated AdjSpeed at process step 778. The process 658 then returns to the calling step at the end of function step 784. The throttle correction process 658 provides an adjustment at least every 400 milliseconds so that variations in the movement of the user applying pressure to the user inputs as compared to the movement of the person support apparatus 10.

Once the control has been passed back to the adjustment starting stage process 656, the process 656 advances to process step 674 where the AdjSpeed is increased by 10 counts once every 10 calls, or about every 400 ms. The process 656 then advances to a decision step 676 where it is determined if the EncoderSpeed variable or the combination of the EncoderSpeed and the value of any acceleration, notated as the variable "AccelValue" exceeds a threshold. If it is determined that the values do not exceed the threshold, then the process 656 ends at step 686.

However, if the values of EncoderSpeed or EncoderSpeed and AccelValue (calculated at process step 646 of the encoder final stage process 610) exceed the threshold value, then the process 656 advances to process step 678 where the throttle correction process 658 discussed above is called. Once the throttle correction process 658 returns at process step 678, the AdjSpeed is reduced by some value depending on the amount of acceleration identified by the system. Then the process 656 advances to process step 682 where the state is changed to the out of range low state and the process advances to process step 684 where the value of a variable ThrottleChange 10 ms Timer is set to a predefined value, illustratively identified as SecondOrderCorrectionTime. The adjustment starting stage process then ends at step 686 and returns to the encoder final stage process at step 662 where the variables that have been set are all returned.

Figure 16:
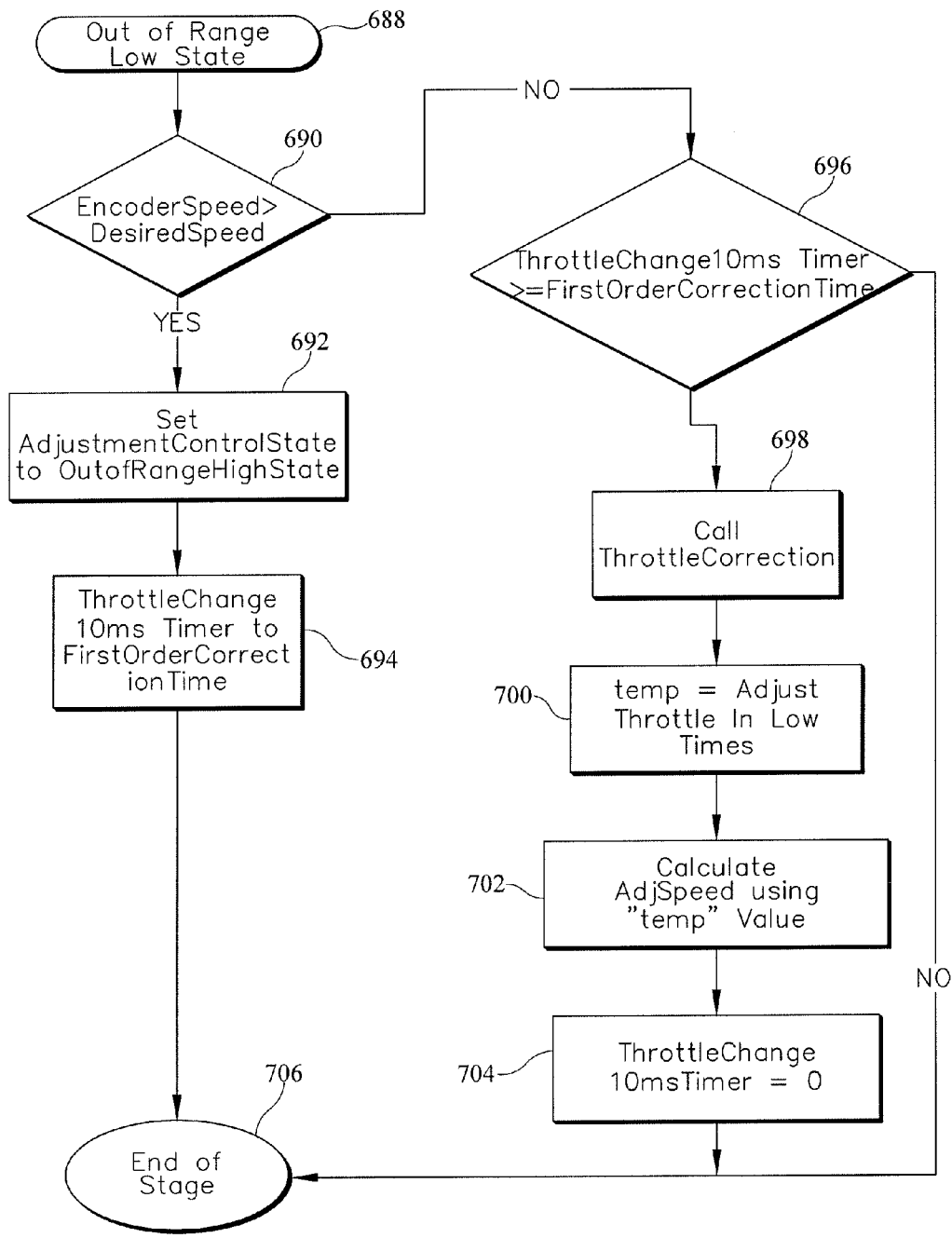
Figure 17:
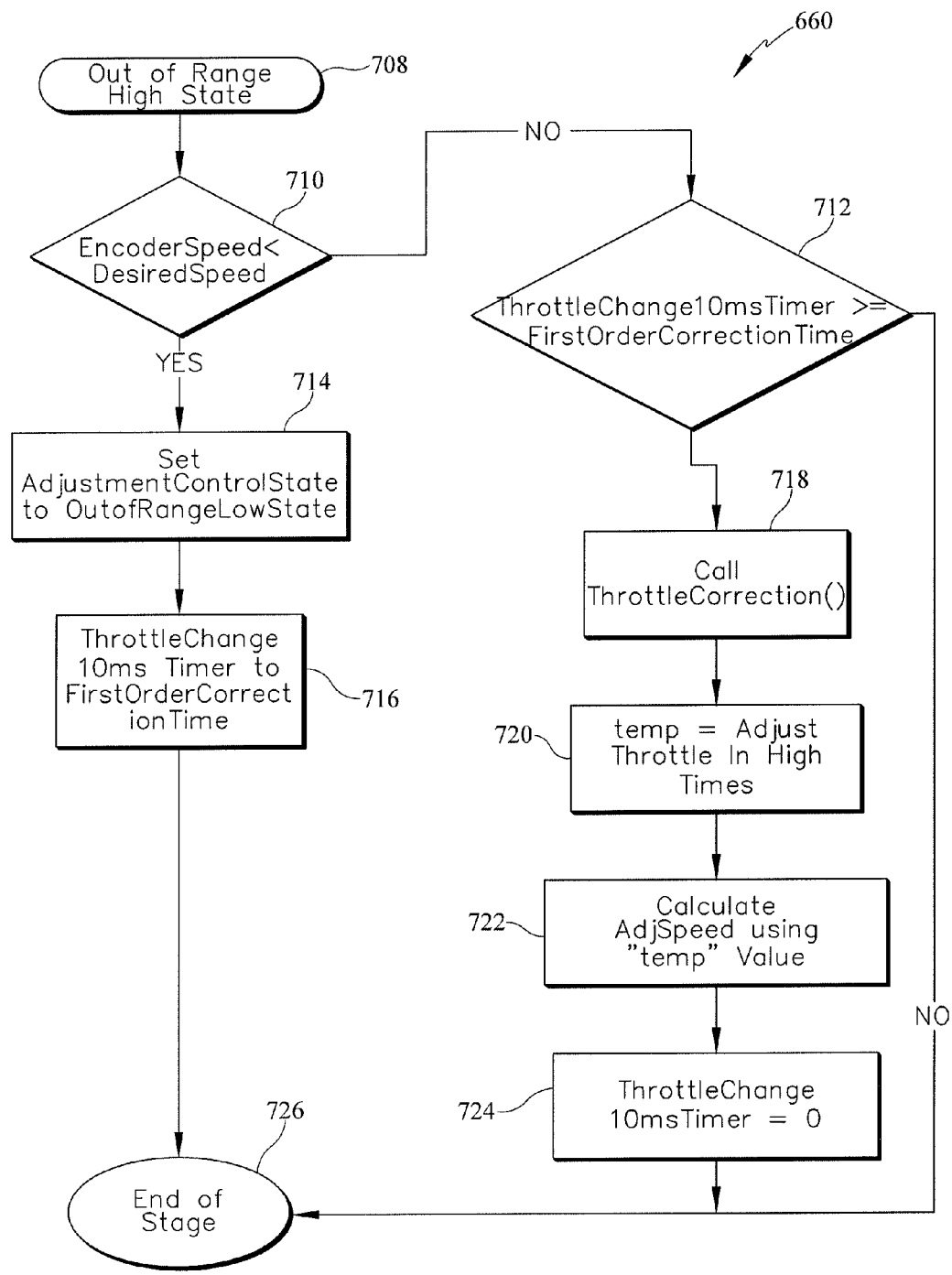
Figure 18:
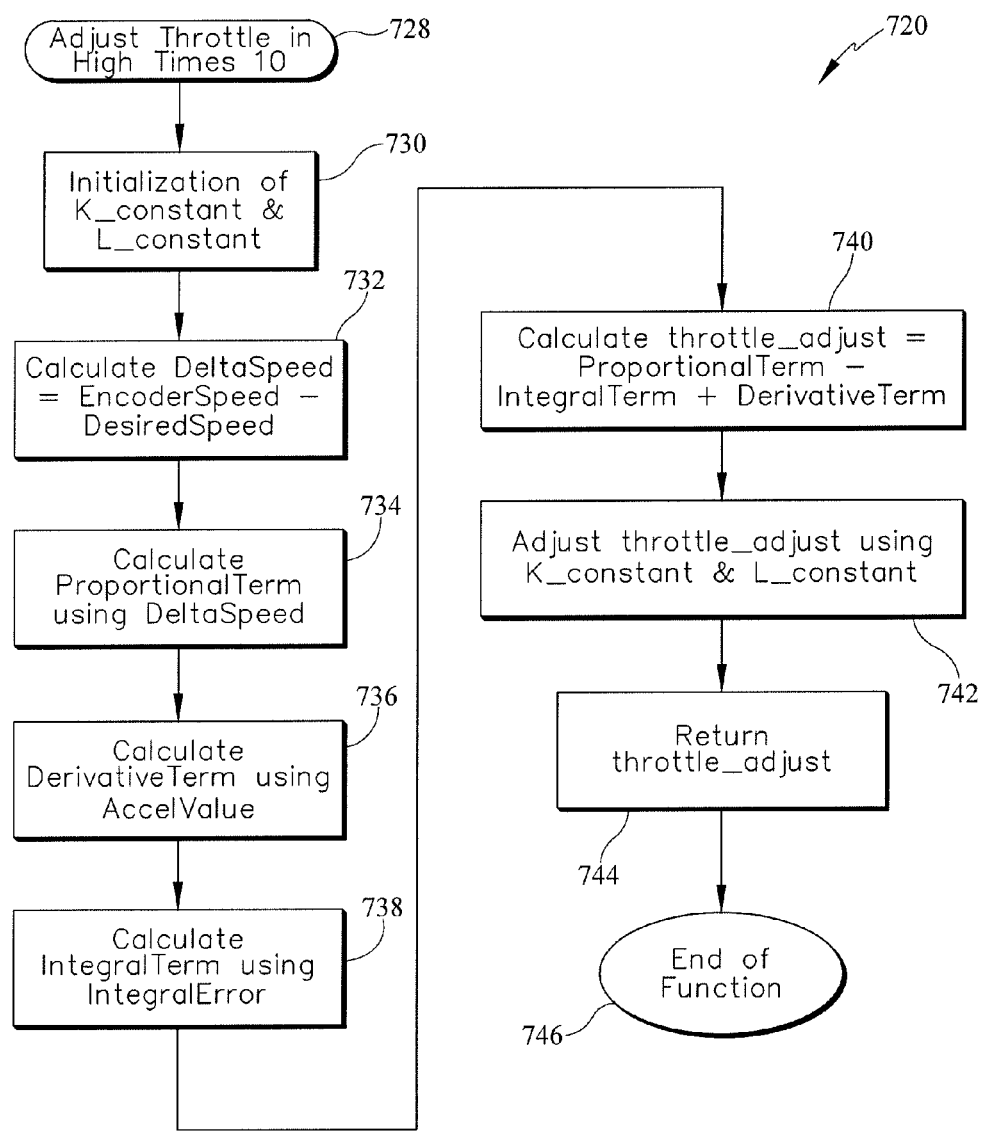
Figure 19:
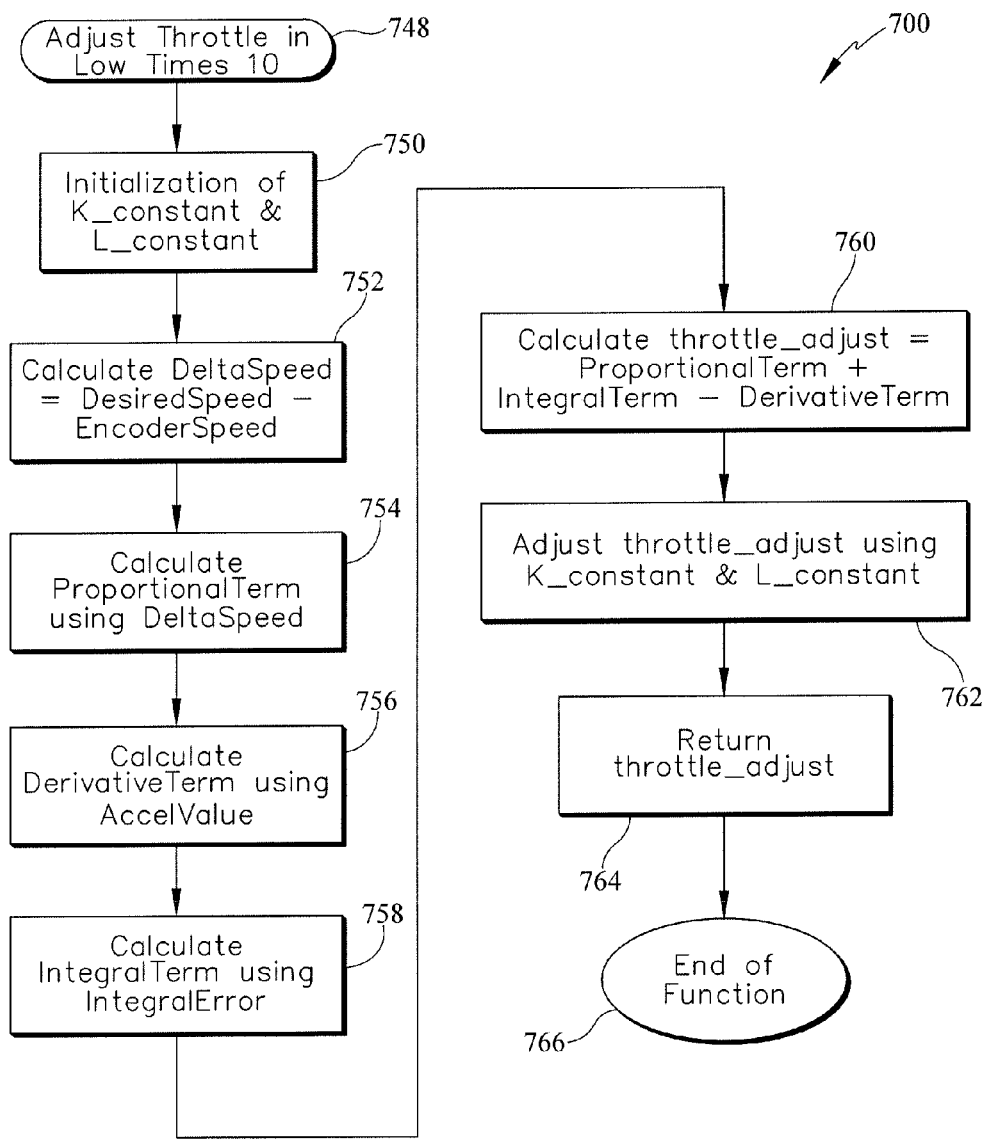
Figure 20:
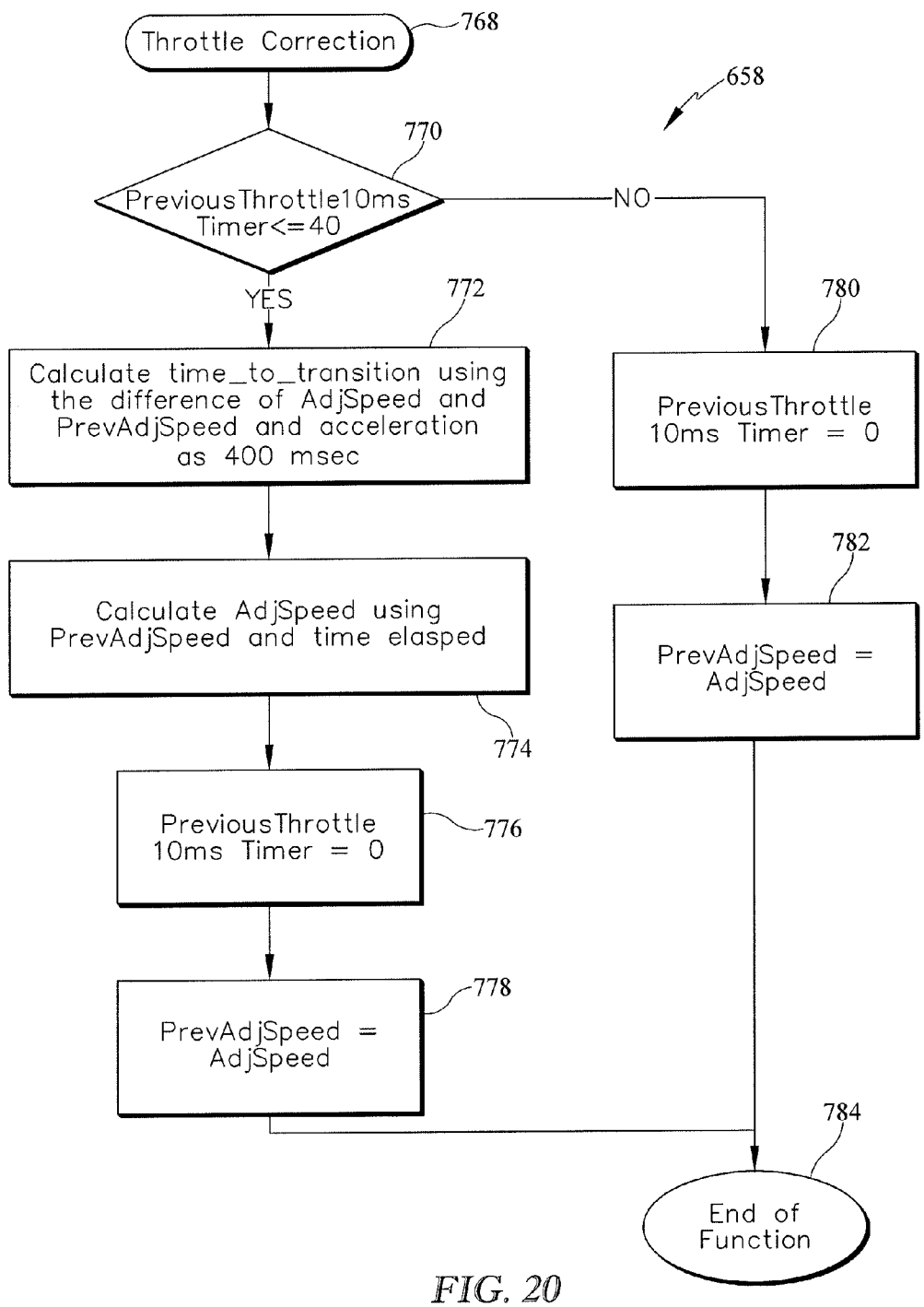

If the adjustment control state is determined to be the out of range low state 658 at process step 654 of the encoder final stage process 610, then the out of range low process 658 is invoked and entered at step 688, shown in FIG. 16. The out of range low process 658 then proceeds to a decision step 690 where it is determined if the EncoderSpeed is greater than the DesiredSpeed. If it is not, then the process 658 advances to decision step 696 where is determined if the ThrottleChange 10 ms Timer is greater than or equal to a predefined value, illustratively identified as FirstOrderCorrectionTime. If is not, then the out of range low state is exited at step 706. However, if the value of the ThrottleChange 10 ms Timer is greater than the FirstOrderCorrectionTime, then the process advances to process step 698 and invokes the throttle correction process 658. Once the throttle correction process 658 is completed and control returns to process 658, then the process 658 advances a process step 700 where a temporary value is determined by invoking an adjust throttle in low times process 700 shown in FIG. 19.

Upon entry to the adjust throttle in low times process at step 748, the proceeds to initialize two constants used in a proportional-integral-derivative (PID) controller calculation at step 750. Then at step 752, the difference in EncoderSpeed is subtracted from the DesiredSpeed to get a value notated as DeltaSpeed. The proportional term of the PID is calculated at step 754 using the DeltaSpeed. In the illustrative embodiment, the proportional term is calculated as:

$$\text{prop\_term} = (Kp\_n * \text{DeltaSpeed} * 100)/Kp\_d$$

where Kp_n is a constant of 1 and Kp_d is set as a constant of 12.
The derivative term is calculated using the value of AccelValue at step 756 following the equation:

$$\text{der\_term} = (Kd\_n * \text{CurrentAccel} * 100)/Kd\_d$$

where Kd_n is defined as a constant of 1 and Kd_d is a constant 7.
The integral term is calculated as a function of a term IntegralError. IntegralError is the accumulated error of DesiredSpeed minus EncoderSpeed over a sample period. The integral term is calculated as:

$$\text{integral\_term} = (Ki\_n * \text{IntegralError} * 100)/Ki\_d$$

where Ki_n is 1 and Ki_d is 7.
The throttle adjust value is then calculated at process step 760 according to the equation:

$$\text{throttle\_adjust} = \text{prop\_term} + \text{integral\_term} - \text{der\_term}$$

The value of throttle_adjust is then corrected according to the equation:

throttle_adjust=(K_constant*throttle_adjust)/L_constant where K_constant is 20 and L_constant is 10.

Once the throttle_adjust value is determined at step 762, it is returned to the out of range low process 658 at step 764 and the process 700 ends at step 766. The AdjSpeed value is then calculated at process step 702 according to the equation:

AdjSpeed=[(throttle_adjust*10+((PreviousThrottle 10 ms Timer*(Adj Speed−throttle_adjust))/10]

The process 658 then progresses process step 724 where the ThrottleChange 10 ms Timer value is set to zero.

If the EncoderSpeed variable is not greater than the DesiredSpeed variable at decision step 690 of process 658, then the process 658 progresses to process step 692 where the adjustment control state is set to the out of range high state and the ThrottleChange 10 ms Timer value is set to is set to the FirstOrderCorrection value at step 694 and the process ends at step 706.

When the controller 202 is in the out of range high state 660, the out of range high state process 660 begins at step 708 and progresses to decision step 710 where the proper state is confirmed by comparing the EncoderSpeed to the DesiredSpeed. If the EncoderSpeed is less than the DesiredSpeed then the process 660 advances to decision step 712 to compare the ThrottleChange 10 ms Timer value to the FirstOrderCorrection time value. If the ThrottleChange 10 ms Timer value is greater than or equal to the FirstOrderCorrection time value, then the process 660 progresses ends at step 726. If the ThrottleChange 10 ms Timer value is less than the FirstOrderCorrection time value, then process 660 progresses to process step 718 and calls the throttle correction process 658. One the process returns to the process 660, the process advances to process step 720 where a temporary value is computed by invoking an adjust throttle in high times process 720.

The adjust throttle in high times 720 process begins at step 728 and initializes the K_constant and L_constant values at step 730. DeltaSpeed is calculated at step 732 as the difference of the DesiredSpeed subtracted from the EncoderSpeed. The proportional term of a PID is caclulated at step 734 and the derivative term is calculated at step 736. The integral term is calculated at step 738 and the preliminary throttle_adjust value is calculated at step 740 by subtracting the integral term from the proportional term and adding the derivative term. The throttle_adjust value is adjusted at step 742 following the equation:

throttle_adjust=(K_constant*throttle_adjust)/L_constant where K_constant is 5 and L_constant is 30.

The value of throttle_adjust is then returned to process 660 at step 744 and the process 720 is ended at step 746.

The AdjSpeed value is then calculated at step 722 following the equation:

AdjSpeed=[(throttle_adjust*10+((PreviousThrottle 10 ms Timer*(AdjSpeed−throttle_adjust))/10]

The ThrottleChange 10 ms Timer is then set to zero at step 724.

If the EncoderSpeed is found not to be less than the DesiredSpeed at decision step 710, then the process 660 advances to step 714 where the adjustment control state is set to the out of range low state. The process then proceeds to process step 716 where the ThrottleChange 10 ms Timer is set to the FirstOrderCorrection time value.

When the encoder final state 617 is complete and has made all of the necessary process calls, the ultimate result is for the value of the AdjSpeed to be returned to the encoder speed process 600 so that the Adj Speed value may be used to update the SpeedCount that is provided to the motor controller 204 to operate the drive motor 42. With this approach, the variations in the EncoderSpeed and DesiredSpeed are resolved such that the powered transport device 24 is capable of maintaining the ground speed of the person support apparatus substantially constant regardless of any changes in rolling resistance as the person support apparatus 10 moves over various surfaces.

Although certain illustrative embodiments have been described in detail above, variations and modifications exist within the scope and spirit of this disclosure as described and as defined in the following claims.

The invention claimed is:

1. A powered transport device for a person support apparatus, the powered transport device comprising
a floor contacting driver,
a prime mover coupled to the driver and with an output of the prime mover providing input to the driver,
a power source providing power to the prime mover, and
a controller,
wherein the controller senses an operating characteristic of the power source and varies the operation of the transport system to mitigate variations in the operating characteristic of the power source.

2. The powered transport device of claim 1, wherein the controller senses an input from a user and an operating characteristic of the transport system and varies the operation of the transport system based on both the user input and the operating characteristic.

3. The powered transport device of claim 2, wherein the controller senses that the driver is slipping relative to the floor and adjusts the output of the prime mover to reduce the slippage of the driver.

4. The powered transport device of claim 2, wherein the controller senses that the load on the prime mover is increasing and adjusts the output of the prime mover to maintain a constant speed of the driver relative to the floor.

5. The powered transport device of claim 2, wherein the controller senses a variation in the operation of the transport system and adjusts an operating parameter of the transport system.

6. A powered transport device for a person support apparatus, the powered transport device comprising
a floor contacting driver,
a prime mover coupled to the driver and with an output of the prime mover providing input to the driver,
a power source providing power to the prime mover, and
a controller sensing a performance characteristic of the powered transport device and varying the operation of the powered transport device based solely on the performance characteristic,
wherein the controller varies the speed of the prime mover based on an input from a user,
wherein the controller senses a variation in the operation of the transport system and adjusts an operating parameter of the transport system,
wherein the controller senses an operating characteristic of the power source and varies the operation of the transport system to mitigate variations in the operating characteristic of the power source.

7. The powered transport device of claim 6, wherein the controller senses an input from a user and an operating characteristic of the transport system and varies the operation of the transport system based on both the user input and the operating characteristic.

8. The powered transport device of claim 2, wherein the controller varies the speed of the prime mover based on the input from a user.

9. The powered transport device of claim 8, wherein the floor contacting driver is movable between a first position wherein the driver is in contact with the floor and a second position wherein the driver is not in contact with the floor.

10. A powered transport device for a person support apparatus, the powered transport device comprising
a floor contacting driver,
a prime mover coupled to the driver and with an output of the prime mover providing input to the driver,
a power source providing power to the prime mover, and
a controller sensing a performance characteristic of the powered transport device and varying the operation of the powered transport device based solely on the performance characteristic,
wherein the floor contacting driver is movable between a first position wherein the driver is in contact with the floor and a second position wherein the driver is not in contact with the floor,
wherein the floor contacting driver is movable between a first position wherein the floor contacting driver is configured to drive the person support apparatus in a direction parallel to the longitudinal axis of the person support apparatus and a second position wherein the floor contacting driver is configured to drive the person support apparatus in a direction parallel to a lateral axis the person support apparatus.

11. A powered transport device for a person support apparatus, the powered transport device comprising
a floor contacting driver,
a prime mover coupled to the driver and with an output of the prime mover providing input to the driver,
a battery providing power to the prime mover, and
a controller (i) providing a drive signal to the prime mover, the drive signal indicative of a desired speed of movement of the powered transport device and (ii) sensing the actual speed of the driver of the powered transport device, and (iii) varying the drive signal to respond to differences between the actual speed and the desired speed, and
wherein the controller monitors the charge of a battery and the operating state of the powered transport device and varies the charging of the battery to mitigate the effects of changes in the operating state of the powered transport device.

12. The powered transport device of claim 11, wherein the prime mover comprises a motor, an output coupled to the driver, and a chain coupled to the motor and the output to transfer motion from the motor to the output.

13. The powered transport device of claim 12, wherein the transport system further comprises a vertical deployment mechanism configured to move the driver to a position contacting the floor.

14. A powered transport device for a person support apparatus, the powered transport device comprising
a floor contacting driver,
a prime mover coupled to the driver and with an output of the prime mover providing input to the driver,
a power source providing power to the prime mover, and
a controller (i) providing a drive signal to the prime mover, the drive signal indicative of a desired speed of movement of the powered transport device and (ii) sensing the actual speed of the driver of the powered transport device, and (iii) varying the drive signal to respond to differences between the actual speed and the desired speed,
wherein the prime mover comprises a motor, an output coupled to the driver, and a chain coupled to the motor and the output to transfer motion from the motor to the output,
wherein the transport system further comprises a vertical deployment mechanism configured to move the driver to a position contacting the floor,
wherein the power source comprises a battery,
wherein the controller monitors the charge of a battery and the operating state of the powered transport device and varies the charging of the battery to mitigate the effects of changes in the operating state of the powered transport device.

15. The powered transport device of claim 14, wherein the controller monitors the battery to determine the rate of discharge of the battery and determines the rate of voltage drop as a function of the battery discharge while the powered transport device operates.

16. The powered transport device of claim 10, wherein the power source comprises a battery.

17. The powered transport device of claim 16, wherein the prime mover comprises a motor, an output coupled to the driver, and a chain coupled to the motor and the output to transfer motion from the motor to the output.

18. The powered transport device of claim 1, wherein the transport system further comprises a vertical deployment mechanism configured to move the driver to a position contacting the floor.

19. The powered transport device of claim 18, wherein the floor contacting driver is movable between a first position wherein the floor contacting driver is configured to drive the person support apparatus in a direction parallel to the longitudinal axis of the person support apparatus and a second position wherein the floor contacting driver is configured to drive the person support apparatus in a direction parallel to a lateral axis the person support apparatus.

* * * * *